(12) United States Patent
Lampell et al.

(10) Patent No.: US 8,933,890 B2
(45) Date of Patent: *Jan. 13, 2015

(54) TECHNIQUES FOR INTERACTIVE INPUT TO PORTABLE ELECTRONIC DEVICES

(75) Inventors: Michael D. Lampell, Novato, CA (US); François-Yves Bertrand, Sunnyvale, CA (US); Alan Berfield, Cupertino, CA (US); Leo Lee, Hercules, CA (US); Eric Snider, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1321 days.

This patent is subject to a terminal disclaimer.

(21) Appl. No.: 11/882,427

(22) Filed: Aug. 1, 2007

(65) Prior Publication Data
US 2008/0018616 A1   Jan. 24, 2008

Related U.S. Application Data

(63) Continuation of application No. 11/530,807, filed on Sep. 11, 2006.

(60) Provisional application No. 60/810,423, filed on Jun. 2, 2006.

(51) Int. Cl.
G06F 3/041    (2006.01)
G09G 5/00    (2006.01)
(Continued)

(52) U.S. Cl.
CPC ............... *A63F 13/00* (2013.01); *G06F 3/048* (2013.01); *G06F 3/0481* (2013.01); *G06F 3/04886* (2013.01); *A63F 2300/1075* (2013.01); *A63F 2300/204* (2013.01)
USPC .......................................... 345/173; 345/156

(58) Field of Classification Search
CPC ............ A63F 13/00; A63F 2300/1075; A63F 2300/204; G06F 3/04886; G06F 3/048–3/04897

USPC .................................. 345/156–184; 715/863; 178/18.01–20.04
See application file for complete search history.

(56) References Cited

U.S. PATENT DOCUMENTS 1,061,578 A   5/1913   Wischhusen et al.
2,063,276 A   12/1936   Thomas
(Continued)

FOREIGN PATENT DOCUMENTS

CN   1139235 A   1/1997
CN   1455615     11/2003
(Continued)

OTHER PUBLICATIONS

Toshiba Satellite R15-S822 review, Jun. 24, 2005, CNET, http://www.cnet.com/laptops/toshiba-satellite-r15-s822/4505-3121_7-31272309.html.*

(Continued)

*Primary Examiner* — Patrick F Marinelli
(74) *Attorney, Agent, or Firm* — Morrison & Foerster LLP

(57) ABSTRACT

Techniques for providing input to interactive and multitasking applications are disclosed. A game input area (surface or plane) receives input for multiple applications including an interactive application executed in connection with a scene. The input received is directed to the appropriate application based on one or more locations (e.g., points, positions, regions, portions) of the input area effectively identified when input is received (or entered). In addition, the manner in which input is received (or entered) can be used to determine which application should receive the input. The input area can additionally resemble or approximate the shape of a scene (e.g., game scene) to allow a person to provide input in a more intuitive way. Accordingly, input can be provided in a simple and more intuitive manner by effectively allowing the user to interact with the input area in a way that mimics or approximates a desired action (e.g., moving a ball or bat around by inputting a rotational movement). Examples of such interaction include positional, directional (e.g., rotational), press or pressure input (or movement) which can easily be provided by a thumb or a finger, for example, on a touch screen.

21 Claims, 17 Drawing Sheets

(51) Int. Cl.
*A63F 13/00* (2014.01)
*G06F 3/048* (2013.01)
*G06F 3/0481* (2013.01)
*G06F 3/0488* (2013.01)

(56) References Cited

U.S. PATENT DOCUMENTS

| | | |
|---|---|---|
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,266,144 A | 5/1981 | Bristol |
| 4,293,734 A | 10/1981 | Pepper, Jr. |
| D264,969 S | 6/1982 | McGourty |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Mailey et al. |
| 5,252,951 A | 10/1993 | Tannenbaum et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,494,157 A | 2/1996 | Golenz et al. |
| 5,495,566 A | 2/1996 | Kwatinetz |
| 5,508,703 A | 4/1996 | Okamura et al. |
| 5,508,717 A | 4/1996 | Miller |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A * | 1/1997 | Foster et al. .................. 715/810 |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A * | 8/1998 | Buxton et al. .................. 715/863 |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Terés |
| 5,815,141 A | 9/1998 | Phares |
| 5,825,351 A | 10/1998 | Tam |
| 5,825,352 A * | 10/1998 | Bisset et al. .................. 345/173 |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |

(56) References Cited

U.S. PATENT DOCUMENTS

| | | |
|---|---|---|
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A * | 5/1999 | Kishi ................. 341/20 |
| 5,907,152 A | 5/1999 | Dandliker et al. |
| 5,907,318 A | 5/1999 | Medina |
| 5,909,211 A | 6/1999 | Combs et al. |
| 5,910,802 A * | 6/1999 | Shields et al. ............ 715/808 |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,057,845 A | 5/2000 | Dupouy |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 * | 10/2001 | Lincke et al. ................. 715/700 |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| D452,250 S | 12/2001 | Chan |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerpheide |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Levi Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 | 10/2005 | Morimoto |
| 6,977,808 B2 | 12/2005 | Lam et al. |
| 6,978,127 B1 | 12/2005 | Bulthuis et al. |

(56) References Cited

U.S. PATENT DOCUMENTS

| | | |
|---|---|---|
| 6,985,137 B2 | 1/2006 | Kaikuranta |
| 7,006,077 B1 | 2/2006 | Uusimäki |
| 7,019,225 B2 | 3/2006 | Matsumoto et al. |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,113,196 B2 | 9/2006 | Kerr |
| 7,117,136 B1 | 10/2006 | Rosedale |
| 7,119,792 B1 | 10/2006 | Andre et al. |
| 7,215,319 B2 | 5/2007 | Kamijo et al. |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Bonnelykke Kristensen et al. |
| 7,397,467 B2 | 7/2008 | Park et al. |
| 7,439,963 B2 | 10/2008 | Geaghan et al. |
| 7,466,307 B2 | 12/2008 | Trent et al. |
| 7,479,949 B2 | 1/2009 | Jobs et al. |
| 7,486,323 B2 | 2/2009 | Lee et al. |
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,645,955 B2 | 1/2010 | Huang et al. |
| 7,671,837 B2 | 3/2010 | Forsblad et al. |
| 7,708,051 B2 | 5/2010 | Katsumi et al. |
| 7,772,507 B2 | 8/2010 | Orr et al. |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0057263 A1* | 5/2002 | Keely et al. ............ 345/179 |
| 2002/0071550 A1 | 6/2002 | Pletikosa |
| 2002/0089545 A1 | 7/2002 | Levi Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0184517 A1 | 10/2003 | Senzui et al. |
| 2003/0184592 A1 | 10/2003 | Awada et al. |
| 2003/0197740 A1 | 10/2003 | Reponen |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109357 A1 | 6/2004 | Cernea et al. |
| 2004/0150619 A1 | 8/2004 | Baudisch et al. |
| 2004/0156192 A1 | 8/2004 | Kerr et al. |
| 2004/0178997 A1 | 9/2004 | Gillespie et al. |
| 2004/0188529 A1 | 9/2004 | Kim |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1* | 2/2005 | Gillespie et al. ............ 345/173 |
| 2005/0030048 A1 | 2/2005 | Bolender |
| 2005/0052425 A1 | 3/2005 | Zadesky et al. |
| 2005/0052426 A1 | 3/2005 | Hagermoser et al. |
| 2005/0052429 A1 | 3/2005 | Philipp |
| 2005/0068304 A1 | 3/2005 | Lewis et al. |
| 2005/0083299 A1 | 4/2005 | Nagasaka |
| 2005/0083307 A1 | 4/2005 | Aufderheide et al. |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0156881 A1 | 7/2005 | Trent et al. |
| 2005/0162402 A1 | 7/2005 | Watanachote |
| 2005/0193351 A1* | 9/2005 | Huoviala ............ 715/815 |
| 2005/0204309 A1 | 9/2005 | Szeto |
| 2005/0237308 A1 | 10/2005 | Autio et al. |
| 2006/0026521 A1 | 2/2006 | Hotelling et al. |
| 2006/0032680 A1 | 2/2006 | Elias et al. |
| 2006/0038791 A1 | 2/2006 | Mackey |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0120834 A1 | 5/2007 | Boillot |

(56) References Cited

U.S. PATENT DOCUMENTS

| | | |
|---|---|---|
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0006453 A1 | 1/2008 | Hotelling et al. |
| 2008/0006454 A1 | 1/2008 | Hotelling et al. |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0065987 A1 | 3/2008 | Boettcher et al. |
| 2008/0069412 A1 | 3/2008 | Champagne et al. |
| 2008/0075296 A1 | 3/2008 | Lindahl et al. |
| 2008/0076495 A1 | 3/2008 | Ng et al. |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0125890 A1 | 5/2008 | Boettcher |
| 2008/0143681 A1 | 6/2008 | XiaoPing |
| 2008/0165158 A1 | 7/2008 | Hotelling et al. |
| 2008/0196945 A1 | 8/2008 | Konstas |
| 2008/0202824 A1 | 8/2008 | Philipp et al. |
| 2008/0209442 A1 | 8/2008 | Setlur et al. |
| 2008/0264767 A1 | 10/2008 | Chen et al. |
| 2008/0280651 A1 | 11/2008 | Duarte |
| 2008/0284742 A1 | 11/2008 | Prest |
| 2008/0293274 A1 | 11/2008 | Milan |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0078551 A1 | 3/2009 | Kang |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0179854 A1 | 7/2009 | Weber et al. |
| 2009/0197059 A1 | 8/2009 | Weber et al. |
| 2009/0229892 A1 | 9/2009 | Fisher et al. |
| 2009/0273573 A1 | 11/2009 | Hotelling |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0149127 A1 | 6/2010 | Fisher et al. |
| 2010/0289759 A1 | 11/2010 | Fisher et al. |
| 2010/0313409 A1 | 12/2010 | Weber et al. |
| 2011/0005845 A1 | 1/2011 | Hotelling et al. |

FOREIGN PATENT DOCUMENTS

| | | |
|---|---|---|
| CN | 1499356 | 5/2004 |
| CN | 1659506 | 8/2005 |
| DE | 3615742 | 11/1987 |
| DE | 19722636 | 12/1998 |
| DE | 10022537 | 11/2000 |
| DE | 20019074 U1 | 2/2001 |
| DE | 10 2004 043 663 | 4/2006 |
| EP | 0178157 | 4/1986 |
| EP | 0419145 A1 | 3/1991 |
| EP | 0498540 A2 | 8/1992 |
| EP | 0521683 A2 | 1/1993 |
| EP | 0674288 A1 | 9/1995 |
| EP | 0 731 407 A1 | 9/1996 |
| EP | 0551778 B1 | 1/1997 |
| EP | 0880091 | 11/1998 |
| EP | 1 026 713 A1 | 8/2000 |
| EP | 1081922 A2 | 3/2001 |
| EP | 1098241 A2 | 5/2001 |
| EP | 1 133 057 | 9/2001 |
| EP | 1162826 A2 | 12/2001 |
| EP | 1 168 396 | 1/2002 |
| EP | 1205836 A2 | 5/2002 |
| EP | 1 244 053 | 9/2002 |
| EP | 1251455 A2 | 10/2002 |
| EP | 1263193 | 12/2002 |
| EP | 1347481 | 9/2003 |
| EP | 1376326 | 1/2004 |
| EP | 1 467 392 | 10/2004 |
| EP | 1482401 A2 | 12/2004 |
| EP | 1 496 467 | 1/2005 |
| EP | 1 517 228 | 3/2005 |
| EP | 1542437 A2 | 6/2005 |
| EP | 1 589 407 | 10/2005 |
| EP | 1 784 058 A2 | 5/2007 |
| EP | 1 841 188 | 10/2007 |
| EP | 1850218 | 10/2007 |
| EP | 1 876 711 | 1/2008 |
| FR | 2 686 440 A1 | 7/1993 |
| GB | 2015167 | 9/1979 |
| GB | 2072389 | 9/1981 |
| GB | 2315186 | 1/1998 |
| GB | 2333215 | 7/1999 |
| GB | 2391060 | 1/2004 |
| GB | 2402105 A | 12/2004 |
| JP | 57-95722 | 6/1982 |
| JP | 57-97626 | 6/1982 |
| JP | 61-117619 | 6/1986 |
| JP | 61-124009 | 6/1986 |
| JP | 63-20411 | 1/1988 |
| JP | 63-106826 | 5/1988 |
| JP | 63-181022 | 7/1988 |
| JP | 63-298518 | 12/1988 |
| JP | 03-57617 | 6/1991 |
| JP | 3-192418 | 8/1991 |
| JP | 04-32920 | 2/1992 |
| JP | 4-205408 | 7/1992 |
| JP | 5-041135 | 2/1993 |
| JP | 5-080938 | 4/1993 |
| JP | 5-101741 | 4/1993 |
| JP | 05-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 05-233141 | 9/1993 |
| JP | 05-262276 | 10/1993 |
| JP | 5-265656 | 10/1993 |
| JP | 5-274956 | 10/1993 |
| JP | 05-289811 | 11/1993 |
| JP | 5-298955 | 11/1993 |
| JP | 5-325723 | 12/1993 |
| JP | 06-20570 | 1/1994 |
| JP | 6-084428 | 3/1994 |
| JP | 6-089636 | 3/1994 |
| JP | 6-96639 | 4/1994 |
| JP | 6-111695 | 4/1994 |
| JP | 6-139879 | 5/1994 |

(56) References Cited

FOREIGN PATENT DOCUMENTS

| | | |
|---|---|---|
| JP | 06-187078 | 7/1994 |
| JP | 06-208433 | 7/1994 |
| JP | 6-230898 | 8/1994 |
| JP | 6-267382 | 9/1994 |
| JP | 06-283993 | 10/1994 |
| JP | 6-333459 | 12/1994 |
| JP | 7-107574 | 4/1995 |
| JP | 7-41882 | 7/1995 |
| JP | 7-201249 | 8/1995 |
| JP | 07-201256 | 8/1995 |
| JP | 07-253838 | 10/1995 |
| JP | 7-261899 | 10/1995 |
| JP | 7-261922 | 10/1995 |
| JP | 07-296670 | 11/1995 |
| JP | 7-319001 | 12/1995 |
| JP | 08-016292 | 1/1996 |
| JP | 8-115158 | 5/1996 |
| JP | 8-203387 | 8/1996 |
| JP | 8-293226 | 11/1996 |
| JP | 8-298045 | 11/1996 |
| JP | 08-299541 | 11/1996 |
| JP | 8-316664 | 11/1996 |
| JP | 09-044289 | 2/1997 |
| JP | 09-069023 | 3/1997 |
| JP | 09-128148 | 5/1997 |
| JP | 9-134248 | 5/1997 |
| JP | 9-218747 | 8/1997 |
| JP | 9-230993 | 9/1997 |
| JP | 9-231858 | 9/1997 |
| JP | 09-233161 | 9/1997 |
| JP | 9-251347 | 9/1997 |
| JP | 9-258895 | 10/1997 |
| JP | 9-288926 | 11/1997 |
| JP | 9-512979 | 12/1997 |
| JP | 10-63467 | 3/1998 |
| JP | 10-74127 | 3/1998 |
| JP | 10-074429 | 3/1998 |
| JP | 10-198507 | 7/1998 |
| JP | 10-227878 | 8/1998 |
| JP | 10-240693 | 9/1998 |
| JP | 10-320322 | 12/1998 |
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 1999-272378 | 10/1999 |
| JP | 11-305896 | 11/1999 |
| JP | 11-338628 | 12/1999 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-230460 | 9/2005 |
| JP | 2005-251218 | 9/2005 |
| JP | 2005-285140 | 10/2005 |
| JP | 2005-293606 | 10/2005 |
| JP | 2006-4101 | 1/2006 |
| JP | 2006-4453 | 1/2006 |
| JP | 2006-178962 | 7/2006 |
| JP | 2006-222504 | 8/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-08579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO 95/00897 A1 | 1/1995 |
| WO | WO-96/27968 | 9/1996 |
| WO | WO-98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/044645 A1 | 5/2003 |
| WO | WO 03/044956 | 5/2003 |
| WO | WO-03/025960 | 9/2003 |
| WO | WO 03/088176 | 10/2003 |
| WO | WO 03/090008 | 10/2003 |
| WO | WO-2004/001573 | 12/2003 |
| WO | WO 2004/040606 | 5/2004 |
| WO | WO-2004/081777 | 9/2004 |
| WO | WO-2004/091956 | 10/2004 |
| WO | WO-2005/055620 A2 | 6/2005 |
| WO | WO 2005/076117 | 8/2005 |
| WO | WO-2005/114369 | 12/2005 |
| WO | WO-2005/124526 A2 | 12/2005 |
| WO | WO-2006/020305 | 2/2006 |
| WO | WO-2006/021211 A2 | 3/2006 |
| WO | WO 2006/037545 | 4/2006 |
| WO | WO 2006/104745 | 10/2006 |
| WO | WO-2006/135127 | 12/2006 |
| WO | WO 2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Tools to Use with Your Tablet PC, Aug. 25, 2004, Microsoft, http://www.microsoft.com/windowsxp/tabletpc/evaluation/overviews/pctools.mspx; Available via Wayback Machine at the listed website with a date of May 16, 2008.*

Jeff Van West, Microsoft Inkball and PowerToys for Tablet PC, Jul. 15, 2003, Microsoft, http://www.microsoft.com/windowsxp/using/tabletpc/learnmore/vanwest_03july15ib.mspx; Available via Wayback Machine at the listed website with a date of Apr. 4, 2005.*

Jeff Van West, Tablet PC Quick Reference, Nov. 6, 2002, Microsoft Press.*

SanDisk Sansa Connect User Guide; 29 pages.

Australian Office Action mailed Jan. 5, 2010 directed to application No. 2007257432; 2 pages.

Interlink Electronics, VersaPad: Integration Guide, © 1998 (VersaPad), pp. 1-35.

Ng et al., U.S. Office Action mailed Jan. 14, 2010, directed to U.S. Appl. No. 11/394,493; 20 pages.

Ng et al., U.S. Office Action mailed Jan. 15, 2010, directed to U.S. Appl. No. 11/882,423; 22 pages.

Tsuk et al., U.S. Office Action mailed Dec. 31, 2009, directed to U.S. Appl. No. 11/610,190; 25 pages.

(56) References Cited

OTHER PUBLICATIONS

Zadesky et al., U.S. Office Action mailed Feb. 4, 2010, directed to U.S. Appl. No. 11/477,469; 14 pages.
Hotelling, U.S. Office Action mailed Jan. 25, 2010, directed to U.S. Appl. No. 11/482,286; 17 pages.
Lynch et al., U.S. Office Action mailed Oct. 5, 2009, directed to U.S. Appl. No. 11/499,360; 7 pages.
Lynch et al., U.S. Office Action mailed Jan. 27, 2010, directed to U.S. Appl. No. 11/499,360; 8 pages.
Letter re: Bang & Olufsen a/s by David Safran, Nixon Peabody, LLP, May 21, 2004, with BeoCom 6000 Sales Training Brochure, 7 pages.
Kobayashi et al. (1994) "Development of the Touch Switches with the Click Response," Koukuu Denshi Gihou No. 17, pp. 44-48 (published by the Japan Aviation Electronics Industry, Ltd.).
Photographs of Innovation 2000 Best of Show Award Presented at the 2000 Int'l CES Innovations Design & Engineering Showcase, Jan. 6, 2000, 1 page.
SanDisk Sansa Connect User Guide, 2007; 29 pages.
Robbin, U.S. Appl. No. 60/346,237 entitled, "Method and System for List Scrolling," filed Oct. 22, 2001; 12 pages.
Zadesky et al., U.S. Appl. No. 60/359,551 entitled "Touchpad for Handheld Device," filed Feb. 25, 2002; 34 pages.
Grignon et al., U.S. Appl. No. 60/755,656, filed Dec. 30, 2005, entitled "Touch Pad with Feedback"; 109 pages.
Elias et al., U.S. Appl. No. 60/522,107, filed Aug. 16, 2004, entitled, "A Method for Increasing the Spatial Resolution of Touch Sensitive Devices"; 15 pages.
Hotelling, U.S. Appl. No. 60/658,777 titled "Multi-Functional Handheld Device," filed Mar. 4, 2005; 68 pages.
Zadesky et al., U.S. Appl. No. 60/714,609 entitled "Scrolling Input Arrangements Using Capacitive Sensors on a Flexible Membrane," filed Sep. 6, 2005; 17 pages.
Lampell et al., U.S. Appl. No. 60/810,423, filed Jun. 2, 2006, entitled "Techniques for Interactive Input to Portable Electronic Devices"; 53 pages.
Prest et al., U.S. Appl. No. 60/850,662, filed Oct. 11, 2006, entitled, "Capacitive Scroll Wheel"; 21 pages.
Bollinger, U.S. Appl. No. 60/858,404, filed Nov. 13, 2006, entitled "Method of Capacitively Sensing Finger Position"; 13 pages.
Rothkopf, U.S. Appl. No. 60/935,854 titled "Compact Media Players," filed Sep. 4, 2007; 36 pages.
Rathnam et al., U.S. Appl. No. 60/992,056, filed Dec. 3, 2007, entitled, "Scroll Wheel Circuit Arrangements and Methods of Use Thereof"; 42 pages.
Rathnam et al., U.S. Appl. No. 61/017,436, filed Dec. 28, 2007, entitled, "Multi-Touch Scroll Wheel Circuit Arrangements and Processing Methods"; 58 pages.
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Fisher et al., U.S. Appl. No. 61/036,804, filed Mar. 14, 2008 entitled "Switchable Sensor Configurations"; 46 pages.
"Touchpad," Notebook PC Manual, ACER Information Co. Ltd., Feb. 16, 2005, pp. 11-12.
Partial International Search Report mailed Mar. 4, 2008, directed to counterpart International application No. PCT/US2007/010639; 3 pages.
Chinese Office Action dated Mar. 11, 2010, directed to counterpart Application No. 2007800204967; 1 page.
Tsuk et al., U.S. Office Action mailed Apr. 28, 2010, directed to U.S. Appl. No. 11/610,190; 29 pages.
Zadesky et al., U.S. Office Action mailed Mar. 30, 2010, directed to U.S. Appl. No. 11/592,679; 13 pages.
Hotelling et al., U.S. Office Action mailed Mar. 30, 2010, directed to U.S. Appl. No. 11/483,008; 20 pages.
Elias et al., U.S. Office Action mailed Mar. 30, 2010, directed to U.S. Appl. No. 11/203,692; 15 pages.
Ng et al., U.S. Office Action mailed Jun. 22, 2010, directed to U.S. Appl. No. 11/394,493; 14 pages.
Lampell, U.S. Office Action mailed Jun. 4, 2010, directed to U.S. Appl. No. 11/530,807; 15 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Hotelling, U.S. Office mailed Jun. 9, 2010, directed to U.S. Appl. No. 11/482,286; 21 pages.
Elias et al., U.S. Office Action mailed Jun. 11, 2010, directed to U.S. Appl. No. 11/203,692; 17 pages.
Weber et al., U.S. Office Action mailed Jun. 7, 2010, directed to U.S. Appl. No. 11/856,530; 15 pages.
Translation of Trekstor's Defense Statement to the District Court Mannheim of May 23, 2008; 37 pages.
"Diamond Multimedia Announces Rio PMP300 Portable MP3 Music Player," located at http://news.harmony-central.com/Newp/1998/Rio-PMP300.html visited on May 5, 2008. (4 pages).
Ng et al., U.S. Office Action mailed Jul. 8, 2010, directed to U.S. Appl. No. 11/882,423; 19 pages.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Tsuk et al., U.S. Office Action mailed Oct. 13, 2006, directed to U.S. Appl. No. 10/256,716; 16 pages.
Tsuk et al., U.S. Office Action mailed Aug. 3, 2006, directed to U.S. Appl. No. 10/256,716; 15 pages.
Tsuk et al., U.S. Office Action mailed Jan. 10, 2006, directed to U.S. Appl. No. 10/256,716; 12 pages.
Tsuk et al., U.S. Office Action mailed Jun. 24, 2005, directed to U.S. Appl. No. 10/256,716; 12 pages.
Tsuk et al., U.S. Office Action mailed Sep. 30, 2004, directed to U.S. Appl. No. 10/256,716; 11 pages.
Tsuk et al., U.S. Office Action mailed Jul. 7, 2009, directed to U.S. Appl. No. 11/610,190; 24 pages.
Robbin et al., U.S. Office Action mailed Jan. 18, 2007, directed to U.S. Appl. No. 10/259,159; 18 pages.
Robbin et al., U.S. Office Action mailed Oct. 13, 2006, directed to U.S. Appl. No. 10/259,159; 18 pages.
Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jun. 16, 2005, directed to U.S. Appl. No. 10/259,159; 16 pages.
Robbin et al., U.S. Office Action mailed Sep. 30, 2004, directed to U.S. Appl. No. 10/259,159; 14 pages.
Zadesky et al., U.S. Office Action mailed Jul. 9, 2008, directed to U.S. Appl. No. 10/643,256; 12 pages.
Zadesky et al., U.S. Office Action mailed Dec. 12, 2007, directed to U.S. Appl. No. 10/643,256; 12 pages.
Zadesky et al., U.S. Office Action mailed Jul. 13, 2007, directed to U.S. Appl. No. 10/643,256; 13 pages.
Zadesky et al., U.S. Office Action mailed Mar. 23, 2007, directed to U.S. Appl. No. 10/643,256; 11 pages.
Zadesky et al., U.S. Office Action mailed Oct. 27, 2006, directed to U.S. Appl. No. 10/643,256; 14 pages.
Forsblad et al., U.S. Office Action mailed Jun. 25, 2009, directed to U.S. Appl. No. 11/355,022; 18 pages.
Forsblad et al., U.S. Office Action mailed Jan. 26, 2009, directed to U.S. Appl. No. 11/355,022; 15 pages.

(56) References Cited

OTHER PUBLICATIONS

Hotelling et al., U.S. Office Action mailed Jan. 27, 2009, directed to U.S. Appl. No. 11/882,421; 15 pages.
Zadesky et al., U.S. Office Action mailed Aug. 6, 2009, directed to U.S. Appl. No. 11/057,050; 30 pages.
Zadesky et al., U.S. Office Action mailed Feb. 20, 2009, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Nov. 26, 2008, directed to U.S. Appl. No. 11/057,050; 25 pages.
Zadesky et al, U.S. Office Action mailed Aug. 19, 2008, directed to U.S. Appl. No. 11/057,050; 23 pages.
Zadesky et al., U.S. Office Action mailed Nov. 20, 2007, directed to U.S. Appl. No. 11/057,050; 33 pages.
Zadesky et al., U.S. Office Action mailed Mar. 5, 2009, directed to U.S. Appl. No. 11/477,469; 12 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Mar. 4, 2004, directed to U.S. Appl. No. 10/188,182; 8 pages.
Zadesky et al., U.S. Office Action mailed Oct. 4, 2007, directed to U.S. Appl. No. 11/386,238; 12 pages.
Zadesky et al.., U.S. Office Action mailed Oct. 4, 2007, directed to U.S. Appl. No. 11/806,957; 14 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Dec. 12, 2006, directed to U.S. Appl. No. 10/722,948; 14 pages.
Marriott et al., U.S. Office Action mailed Jun. 2, 2006, directed to U.S. Appl. No. 10/722,948; 12 pages.
Hotelling et al., U.S. Office Action mailed Jul. 24, 2009, directed to U.S. Appl. No. 11/483,008; 17 pages.
Hotelling et al., U.S. Office Action mailed Jul. 27, 2009, directed to U.S. Appl. No. 11/882,420; 17 pages.
Elias et al., U.S. Office Action mailed Aug. 4, 2009, directed to U.S. Appl. No. 11/203,692; 12 pages.
Elias et al., U.S. Office Action mailed Feb. 23, 2009, directed to U.S. Appl. No. 11/203,692; 13 pages.
Elias et al., U.S. Office Action mailed Sep. 17, 2008, directed to U.S. Appl. No. 11/203,692; 8 pages.
"About Quicktip®" www.logicad3d.com/docs/qt.html, downloaded Apr. 8, 2002.
"Apple Presents iPod: Ultra-Portable MP3 Music Player Puts 1,000 Songs in Your Pocket," retreived from http://www.apple.com/pr/library/2001/oct/23ipod.html on Oct. 23, 2001.
"Apple Unveils Optical Mouse and New Pro Keyboard," Press Release, Jul. 19, 2000.
"Der Klangmeister," Connect Magazine, Aug. 1998.
"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
"Product Overview—ErgoCommander®," www.logicad3d.com/products/ErgoCommander.htm, downloaded Apr. 8, 2002.
"Product Overview—SpaceMouse® Classic," www.logicad3d.com/products/Classic.htm, downloaded Apr. 8, 2002.
"Synaptics Tough Pad Interfacing Guide," Second Edition, Mar. 25, 1998, Synaptics, Inc., San Jose, CA, pp. 1-90.
"System Service and Troubleshooting Manual," www.dsplib.com/intv/Master, downloaded Dec. 11, 2002.
"Alps Electric introduces the GlidePoint Wave Keyboard; combines a gently curved design with Alps' advanced GlidePoint Technology", Business Wire, (Oct. 21, 1996).
Alps Electric Ships GlidePoint Keyboard for the Macintosh; Includes a GlidePoint Touchpad, Erase-Eaze Backspace Key and Contoured Wrist Rest, Business Wire, (Jul. 1, 1996).
"APS show guide to exhibitors", Physics Today, 49(3) (Mar. 1996).
"Design News literature plus", Design News, 51(24) (Dec. 18, 1995).
"Manufactures", Laser Focus World, Buyers Guide '96, 31(12) (Dec. 1995).
"National Design Engineering Show", Design News, 52(5) (Mar. 4, 1996).
"Preview of exhibitor booths at the Philadelphia show", Air Conditioning Heating & News, 200(2) (Jan. 13, 1997).
"Product news", Design News, 53(11) (Jun. 9, 1997).
"Product news", Design News, 53(9) (May 5, 1997).
Ahl, "Controller Update", Creative Computing vol. 9, No. 12, Dec. 1983, pp. 142-154.
Ahmad, "A Usable Real-Time 3D Hand Tracker," Proceedings of the 28th Asilomar Conference on Signals, Systems and Computers—Part 2 (of 2) vol. 2 (Oct. 1994), 5 pages.
Atari VCS/2600 Peripherals, www.classicgaming.com, downloaded Feb. 28, 2007, pp. 1-15.
Baig, E.C., "Your PC Just Might Need a Mouse," U.S. News & World Report 108(22) (Jun. 4, 1990).
Bang & Olufsen Telecom a/s, "BeoCom 6000 User Guide 2000." BeoCom 6000, Sales Training Brochure, date unknown.
Bartimo, Jim, "The Portables: Traveling Quickly", Computerworld (Nov. 14, 1983).
BeoCom 6000, Sales Training Brochure, date unknown.
Bray, "Phosphors help switch on xenon," Physics in Action, pp. 1-3, Apr. 1999.
Brink et al., "Pumped-up portables", U.S. News & World Report, 116(21) (May 30, 1994).
Brown et al., "Windows on Tablets as a Means of Achieving Virtual Input Devices", Human-Computer Interaction—INTERACT '90 (1990).
Buxton et al., "Issues and Techniques in Touch-Sensitive Tablet Input", Computer Graphics, 19(3), Proceedings of SIGGRAPH '85 (1985).
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices", Computer Graphics 22(4) (Aug. 1988).
Chinese Office Action issue Dec. 29, 2006, directed to CN Application No. 200510103886.3, 25 pages.
De Meyer, Kevin, "Crystal Optical Mouse," Feb. 14, 2002, Heatseekerz, Web Article 19.
Evans et al., "Tablet-based Valuators that Provide One, Two, or Three Degrees of Freedom", Computer Graphics 15(3) (Aug. 1981).
EVB Elektronik "TSOP6238 IR Receiver Modules for Infrared Remote Control Systems" dated Jan. 2004 1 page.
Fiore, "Zen Touchpad," Cornell University, May 2000, 6 pages.
Gadgetboy, "Point and click with the latest mice," CNET Asia Product Review, www.asia.cnet.com/reviews...are/gadgetboy/0,39001770,380235900,00.htm downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Jesitus, John , "Broken promises?", Industry Week/IW, 246(20) (Nov. 3, 1997).
Kobayashi et al. (1997) "Dynamic Soundscape: Mapping Time to Space for Audio Browsing," *Computer Human Interaction*: 16 pages.
Kobayashi et al. "Development of the Touch Switches with the Click Response," Koukuu Denshi Gihou No. 17: pp. 44-48 (Mar. 1994) (published by the Japan Aviation Electronics Industry, Ltd.); Translation of Summary.
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Letter re: Bang & Olufsen a/s by David Safran, Nixon Peabody, LLP May 21, 2004.
Luna Technologies International, Inc., LUNA Photoluminescent Safety Products, "Photoluminescence—What is

(56) References Cited

OTHER PUBLICATIONS

Photoluminescence?" from website at http://www.lunaplast.com/photoluminescence.com on Dec. 27, 2005.

Mims, Forrest M., III, "A Few Quick Pointers; Mouses, Touch Screens, Touch Pads, Light Pads, and the Like Can Make System Easier to Use," Computers & Electronics (22) (May 1984).

Nass, Richard, "Touchpad input device goes digital to give portable systems a desktop "mouse-like" feel", Electronic Design, 44(18) (Sep. 3, 1996).

Perenson, Melissa, "New & Improved: Touchpad Redux", PC Magazine (Sep. 10, 1996).

Petersen, Marty, "Koala Pad Touch Tablet & Micro Illustrator Software," InfoWorld (Oct. 10, 1983).

Petruzzellis, "Force-Sensing Resistors" Electronics Now, 64(3), (Mar. 1993).

Photographs of Innovation 2000 Best of Show Award Presented at the 2000 Int'l CES Innovations 2000 Design & Engineering Showcase, 1 page.

Soderholm, Lars G., "Sensing Systems for 'Touch and Feel,'" Design News (May 8, 1989): pp. 72-76.

Sony presents "Choice Without Compromise" at IBC '97 M2 Presswire (Jul. 24, 1997).

Spiwak, Marc, "A Great New Wireless Keyboard", Popular Electronics, 14(12) (Dec. 1997).

Spiwak, Marc, "A Pair of Unusual Controllers", Popular Electronics 14(4) (Apr. 1997).

Sylvania, "Intellvision™ Intelligent Television Master Component Service Manual," pp. 1, 2 and 8, 1979.

Tessler, Franklin, "Point Pad", Macworld 12(10) (Oct. 1995).

Tessler, Franklin, Smart Input: How to Chose from the New Generation of Innovative Input Devices, Macworld 13(5) (May 1996).

Tessler, Franklin, "Touchpads", Macworld 13(2) (Feb. 1996).

"Triax Custom Controllers due; Video Game Controllers," HFD—The Weekly Home Furnishing Newspaper 67(1) (Jan. 4, 1993).

Tsuk et al., U.S. Office Action mailed Aug. 6, 2010, directed to U.S. Appl. No. 11/610,190; 30 pages.

Zadesky et al., U.S. Office Action mailed Aug. 2, 2010, directed to U.S. Appl. No. 11/882,004; 9 pages.

Marriott et al., U.S. Office Action mailed Aug. 19, 2010, directed to U.S. Appl. No. 11/882,422; 13 pages.

Hotelling, U.S. Office Action mailed Aug. 18, 2010, directed to U.S. Appl. No. 11/882,424; 16 pages.

Bull, U.S. Office Action mailed Jul. 9, 2010, directed to U.S. Appl. No. 11/849,801; 13 pages.

Tsuk et al., U.S. Office Action mailed Aug. 7, 2009, directed to U.S. Appl. No. 11/610,181; 20 pages.

Robbin et al., U.S. Office Action mailed Aug. 10, 2009, directed to U.S. Appl. No. 11/610,376; 11 pages.

Robbin et al., U.S. Office Action mailed Aug. 12, 2009, directed to U.S. Appl. No. 11/610,384; 20 pages.

Hotelling, U.S. Office Action mailed Sep. 1, 2009, directed to U.S. Application No. 11/482,286; 14 pages.

Lampell, U.S. Office Action mailed Sep. 15, 2009, directed to U.S. Appl. No. 11/530,807; 15 pages.

Boling, Douglas (1993) "Programming Microsoft Windows CE.NET," p. 109.

KIPO's Notice of Preliminary Rejection dated Sep. 29, 2010, directed to counterpart application No. 10-2008-7032038; 4 pages.

Tsuk et al., U.S. Office Action mailed Nov. 1, 2010, directed to U.S. Appl. No. 11/959,918; 8 pages.

Tsuk et al., U.S. Office Action mailed Oct. 26, 2010, directed to U.S. Appl. No. 11/959,942; 27 pages.

Robbin et al., U.S. Office Action mailed Oct. 29, 2010, directed to U.S. Appl. No. 11/838,845; 8 pages.

Ng et al., U.S. Office Action mailed Oct. 26, 2010, directed to U.S. Appl. No. 11/882,423; 18 pages.

Zadesky et al., U.S. Office Action mailed Oct. 4, 2010, directed to U.S. Appl. No. 11/057,050; 31 pages.

McKillop et al., U.S. Office Action mailed Sep. 16, 2010, directed to U.S. Appl. No. 11/591,752; 14 pages.

Zadesky et al., U.S. Office Action mailed Sep. 29, 2010, directed to U.S. Appl. No. 11/882,003; 13 pages.

Hotelling, U.S. Office Action mailed Oct. 1, 2010, directed to U.S. Appl. No. 11/482,286; 28 pages.

Hotelling et al., U.S. Office Action mailed Oct. 27, 2010, directed to U.S. Appl. No. 11/483,008; 23 pages.

Weber et al., U.S. Office Action mailed Oct. 13, 2010, directed to U.S. Appl. No. 12/205,795; 15 pages.

International Search Report and Written Opinion, dated Dec. 6, 2007, directed to related International Application No. PCT/US2007/015501.

EP Communication under Rule 71(3) EPC dated Mar. 11, 2011, directed to application No. 07776617.8; 60 pages.

Tsuk et al., U.S. Office Action mailed Apr. 19, 2011, directed to U.S. Appl. No. 11/610,190; 25 pages.

Tsuk et al., U.S. Office Action mailed Mar. 31, 2011, directed to U.S. Appl. No. 11/959,918; 9 pages.

Robbin et al., U.S. Office Action mailed Apr. 26, 2011, directed to U.S. Appl. No. 11/838,845; 9 pages.

Zadesky et al., U.S. Office Action mailed Mar. 31, 2011, directed to U.S. Appl. No. 11/882,005; 7 pages.

Bollinger et al., U.S. Office Action mailed Mar. 21, 2011, directed to U.S. Appl. No. 11/842,724; 22 pages.

McKillop et al., U.S. Office Action mailed Mar. 24, 2011, directed to U.S. Appl. No. 11/591,752; 11 pages.

Zadesky et al., U.S. Office Action mailed Mar. 16, 2011, directed to U.S. Appl. No. 11/882,003; 12 pages.

Rathnam et al., U.S. Office Action mailed Mar. 24, 2011, directed to U.S. Appl. No. 12/205,757; 14 pages.

Ng et al., U.S. Office Action mailed Dec. 9, 2010, directed to U.S. Appl. No. 11/394,493; 13 pages.

Zadesky et al., U.S. Office Action mailed Nov. 16, 2010, directed to U.S. Appl. No. 11/477,469; 13 pages.

Lampell, U.S. Office Action mailed Dec. 3, 2010, directed to U.S. Appl. No. 11/530,807; 17 pages.

Hotelling, U.S. Office Action mailed Dec. 8, 2010, directed to U.S. Appl. No. 11/482,286; 33 pages.

Elias et al., U.S. Office Action mailed Nov. 22, 2010, directed to U.S. Appl. No. 11/203,692; 6 pages.

Zadesky et al, U.S. Office Action mailed Feb. 1, 2011, directed to U.S. Appl. No. 11/882,004; 16 pages.

Bull, U.S. Office Action mailed Feb. 4, 2011, directed to U.S. Appl. No. 11/849,801; 22 pages.

Weber et al, U.S. Office Action mailed Jan. 7, 2011, directed to U.S. Appl. No. 11/856,530; 13 pages.

Weber et al., U.S. Office Action mailed Jan. 7, 2011, directed to U.S. Appl. No. 12/205,795; 21 pages.

Weber et al., U.S. Office Action mailed Feb. 17, 2011, directed to U.S. Appl. No. 12/844,502; 11 pages.

Apple Computer, Inc. (2004). Ipod Mini User's Guide., pp. 1-62.

Extended Search Report dated Mar. 29, 2012, directed to European Application No. 11007248.5; 8 pages.

Lampell et al., U.S. Office Action mailed May 2, 2012, directed to U.S. Appl. No. 13/285,824; 20 pages.

Japanese Notification of Reasons for Rejection, mailed Aug. 1, 2011, directed to Japanese Patent Application No. 2009-513157; 5 pages.

\* cited by examiner

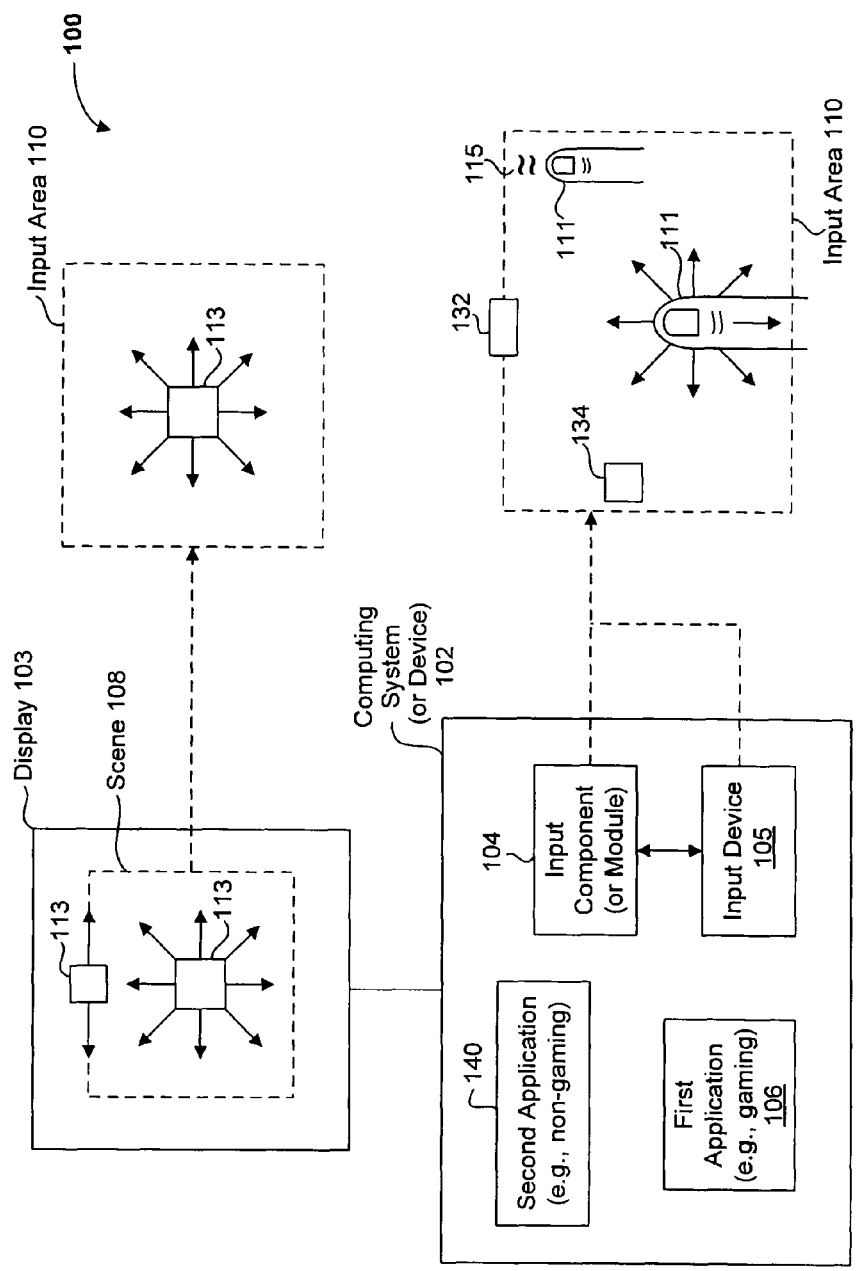

Press Down for a
non-gaming
(e.g., media player)
function

Tap or Touch for
directional
movement for a
game

Rotational
movement for a
game

TECHNIQUES FOR INTERACTIVE INPUT TO PORTABLE ELECTRONIC DEVICES

CROSS-REFERENCE TO RELATED APPLICATIONS

This application is a continuation of application Ser. No. 11/530,807, filed Sep. 11, 2006, which claims the benefit of priority from U.S. Provisional Application No. 60/810,423, filed Jun. 2, 2006, titled "TECHNIQUES FOR INTERACTIVE INPUT TO PORTABLE ELECTRONIC DEVICES," which are hereby incorporated by reference.

This application is related to: (i) U.S. Pat. No. 7,046,230, filed Jul. 2, 2002, and entitled "TOUCH PAD FOR HANDHELD DEVICE," which is hereby incorporated herein by reference; (ii) U.S. patent application Ser. No. 10/722,948, filed Nov. 25, 2003, and entitled "TOUCH PAD FOR HANDHELD DEVICE," which is hereby incorporated herein by reference; (iii) U.S. patent application Ser. No. 11/481,303, filed Jul. 3, 2006, and entitled "MEDIA MANAGEMENT SYSTEM FOR MANAGEMENT OF GAMES ACQUIRED FROM A MEDIA SERVER," which is hereby incorporated herein by reference.

BACKGROUND OF THE INVENTION

Conventional input devices (e.g., a keyboard, mouse) are used to provide input to various application programs (applications) running (or being executed) on conventional computing systems (e.g., personal computers). Generally speaking, providing input to an application program running on a mobile device (e.g., portable media player, mobile phones) poses a more difficult problem, especially when an "interactive" application (e.g., gaming application) and/or multiple applications are to be supported. Broadly speaking, applications that receive or require input can be characterized as "interactive" applications.

Typically, interactive applications require input in connection with data or content displayed. The data or content displayed can be characterized as a "scene." In general, data or content (or scene) displayed is manipulated or controlled based on the input when an interactive application is executed. Often, a person (or a human being) provides the input while viewing the data or content (or scene) displayed by the interactive application.

In a "multitasking" (or multiprogramming) computing environment, multiple applications are effectively supported at the same time. Those skilled in the art will readily appreciate that multitasking poses difficult technical challenges, especially when an interactive application is supported on a mobile device. Despite these challenges, interactive and multitasking applications have become increasingly more popular with users of mobile devices.

Accordingly, improved techniques for providing user input to interactive and multitasking applications would be useful.

SUMMARY OF THE INVENTION

Broadly speaking, the invention relates to improved techniques for providing user input to interactive and multitasking computing environments. The invention can be implemented in numerous ways, including a method, an apparatus, a computer readable medium. Several aspects and embodiments of the invention are discussed below.

One aspect of the invention provides a game input area (surface or plane) that can receive input for multiple applications including an interactive application executed in connection with a scene displayed on a display. Input is directed to the appropriate application based on one or more locations (e.g., points, positions, regions, portions) of the input area effectively identified when input is received (e.g., when input is entered by a person by touching a particular position on a touch screen). In addition, the manner in which input is received (or entered) can be used to determine which application should receive the input. By way of example, the same input area can be effectively used to receive input from a gaming application and a non-gaming application at substantially the same time. More particularly, the input area for a gaming application can effectively overlap or include a number of locations that are designated for a non-gaming application (e.g., a media playback application) and/or designated as such only if input is received in a particular manner (e.g., pushing or pressing of any location, or a particular designated location, would result in sending the input to non-gaming application). As such, a location on the input area can be designated, for example, for a gaming application if input is received in a particular manner different than that designated for the non-gaming application (e.g., tapping or touching the region would send input to a gaming application, but pressing would result in a media player function). Accordingly, this aspect of the invention allows the same input area to be used for multiple applications. Hence, a person can use the same input area (e.g., a top surface or plane of a physical input device such as a touch screen) to multitask: In other words, the person can, for example, play a game and exercise control over another application (e.g., media playback application) using the same input area.

Another aspect of the invention provides an input area that resembles or approximates the shape of a scene (e.g., game scene) associated with an application (e.g., a gaming application). Typically, the scene is used in connection with the application (e.g., a game scene is used to play a game, a record is displayed for a database program and manipulated based on input). Further, the scene is often controlled or manipulated based on input provided by a person. Typically, this requires one or more objects to be controlled or manipulated in the scene based on input provided. It will be appreciated that an input area that resembles or approximates the scene allows a person to provide input in a more intuitive way. Further, input can be provided in a simple and more intuitive manner by effectively allowing the user to interact with the input area in a way that mimics or approximated a desired action or motion of an object displayed in the scene (e.g., moving a ball or bat around by mimicking the motion on the input area). Examples of such interactions include that can be characterized as positional, directional, rotational, pressing and/or pushing type inputs (or movement).

It will be appreciated that these and other aspects of the invention can be combined to realize additional benefits. In general, the invention allows various applications to be integrated and used on devices that are not readily suitable for supporting multiple applications at the same time. As an example, a portable media player can be effectively integrated with various other applications including gaming applications. The media player can, for example, be used to play a game and still behave as a media player during the game play. It will also be appreciated that media player can provide the same media presentation functions (e.g., play, pause, next, back) that users have become accustomed to and provide them in a familiar manner. In one embodiment, a music-based game is provided on a media player. The music-based game can, for example, use individualized music (e.g., music owned and/or stored by an individual). It will be appreciated that a person can use the same input area (or input device) to not only play the game but also control the music being played while the game is in progress. The game can be controlled by using intuitive and simple motions (e.g., directional and/or rotational movement and/or touching a particular location using a thumb or finger). In one embodiment, during game play, the media player can still be controlled in the manner familiar to users.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 2A-C depict a computing environment in accordance with one or more embodiments of the invention.

DETAILED DESCRIPTION OF THE INVENTION

Figure 1A:
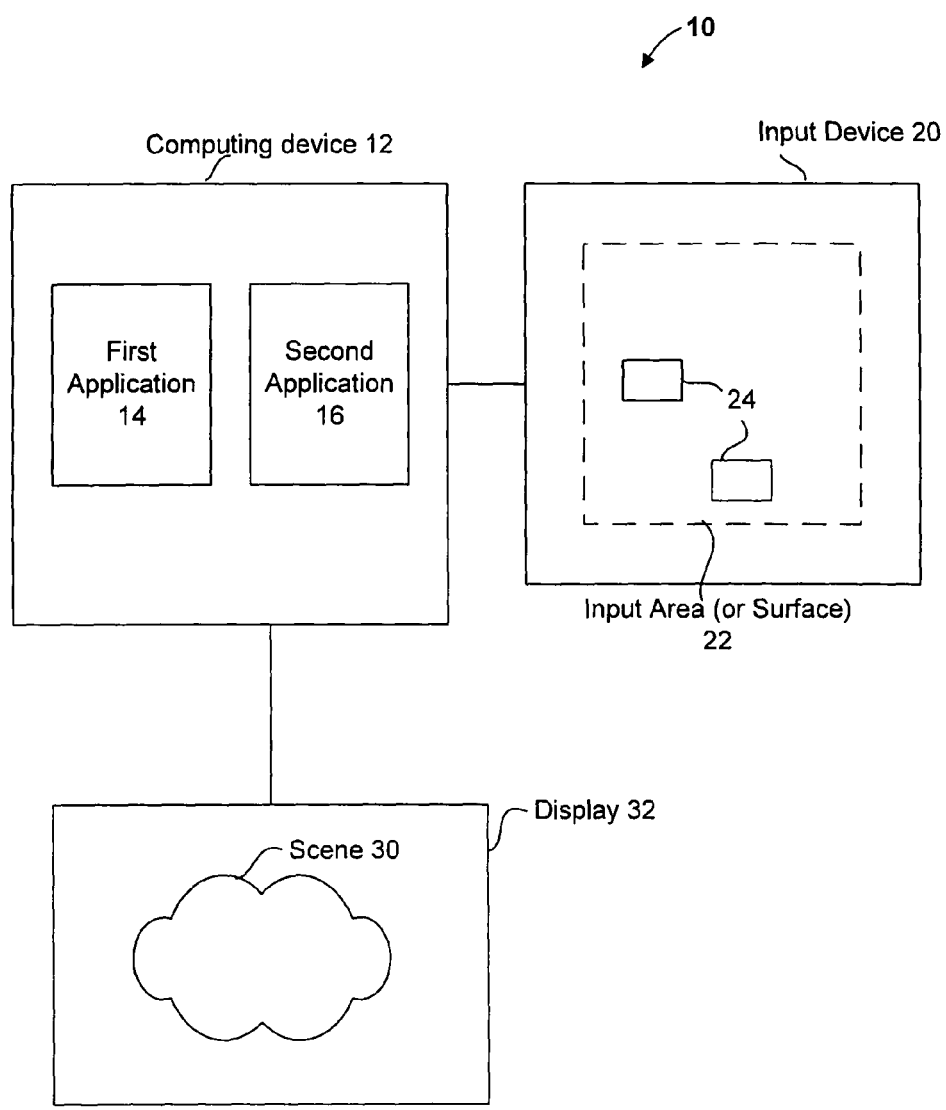
FIG. 1A depicts a computing environment where first and second application programs (or applications) are effectively executed by a computing device in accordance with one embodiment of the invention.

The invention pertains to improved techniques for providing user input to interactive and multitasking computing environments. The invention can be implemented in numerous ways, including a method, an apparatus, a computer readable medium. Several aspects and embodiments of the invention are discussed below.

One aspect of the invention provides a game input area (surface or plane) that can receive input for multiple applications including an interactive application executed in connection with a scene displayed on a display. Input is directed to the appropriate application based on one or more locations (e.g., points, positions, regions, portions) of the input area effectively identified when input is received (e.g., when input is entered by a person by touching a particular position on a touch screen). In addition, the manner in which input is received (or entered) can be used to determine which application should receive the input. By way of example, the same input area can be effectively used to receive input from a gaming application and a non-gaming application at substantially the same time. More particularly, the input area for a gaming application can effectively overlap or include a number of locations that are designated for a non-gaming application (e.g., a media playback application) and/or designated as such only if input is received in a particular manner (e.g., pushing or pressing of any location, or a particular designated location, would result in sending the input to non-gaming application). As such, a location on the input area can be designated, for example, for a gaming application if input is received in a particular manner different than that designated for the non-gaming application (e.g., tapping or touching the region would send input to a gaming application, but pressing would result in a media player function). Accordingly, this aspect of the invention allows the same input area to be used for multiple applications. Hence, a person can use the same input area (e.g., a top surface or plane of a physical input device such as a touch screen) to multitask. In other words, the person can, for example, play a game and exercise control over another application (e.g., media playback application) using the same input area.

Another aspect of the invention provides an input area that resembles or approximates the shape of a scene (e.g., game scene) associated with an application (e.g., a gaming application). Typically, the scene is used in connection with the application (e.g., a game scene is used to play a game, a record is displayed for a database program and manipulated based on input). Further, the scene is often controlled or manipulated based on input provided by a person. Typically, this requires one or more objects to be controlled or manipulated in the scene based on input provided. It will be appreciated that an input area that resembles or approximates the scene allows a person to provide input in a more intuitive way. Further, input can be provided in a simple and more intuitive manner by effectively allowing the user to interact with the input area in a way that mimics or approximated a desired action or motion of an object displayed in the scene (e.g., moving a ball or bat around by mimicking the motion on the input area). Examples of such interactions include that can be characterized as positional, directional, rotational, pressing and/or pushing type inputs (or movement).

It will be appreciated that these and other aspects of the invention can be combined to realize additional benefits. In general, the invention allows various applications to be integrated and used on devices that are not readily suitable for supporting multiple applications at the same time. As an example, a portable media player can be effectively integrated with various other applications including gaming applications. The media player can, for example, be used to play a game and still behave as a media player during the game play. It will also be appreciated that media player can provide the same media presentation functions (e.g., play, pause, next, back) that users have become accustomed to and provide them in a familiar manner. In one embodiment, a music-based game is provided on a media player. The music-based game can, for example, use individualized music (e.g., music owned and/or stored by an individual). It will be appreciated that a person can use the same input area (or input device) to not only play the game but also control the music being played while the game is in progress. The game can be controlled by using intuitive and simple motions (e.g., directional and/or rotational movement and/or touching a particular location using a thumb or finger). In one embodiment, during game play, the media player can still be controlled in the manner familiar to users.

Embodiments of these aspects of the invention are discussed below with reference to FIGS. 1A-6. However, those skilled in the art will readily appreciate that the detailed description given herein with respect to these figures is for explanatory purposes as the invention extends beyond these limited embodiments.

In accordance with one aspect of the invention, an input device can effectively provide input for multiple application programs (or applications) during execution or runtime when the applications are both being executed. To further elaborate, FIG. 1A, depicts a computing environment 10 where first and second application programs (or applications) 14 and 16 are effectively executed by a computing device 12 (e.g., a personal computer, laptop, mobile phone, portable media player). Referring to FIG. 1A, an input device 20 effectively provides an input area (surface or plane) 22 for receiving input for both applications 14 and 16. More particularly, one or more locations (e.g., points, positions, regions, portions) 24 on the input area 22 are designated for receiving input for the first application program 14 when input is provided in a manner designated for the first application 14. By way of example, input that effectively pushes or presses on the one or more locations 24 can be designated for the first application 14. However, it will be appreciated that input provided in a different manner (e.g., touching, tapping, or rubbing over) can be designated and provided for the second application 16. Those skilled in the art will appreciate that the manner in which input can be provided can vary widely. Nevertheless, a few exemplary ways for providing input are discussed below.

It should be noted that input device 20 is especially well suited for situations where the first application is executed in connection with a scene 30 displayed on a display 32 of the computing environment 10. One example is a gaming application where the first scene 30 is a scene for a game (game scene) where various game objects are displayed and controlled (or manipulated) based on the input effectively provided by the input device 20. As another example, the first or second application (14 or 16) can be a media playback application for presentation of media. In any case, it will be appreciated that the input area (or surface) 22 can be used to effectively provide input for both the first and second applications 14 and 16. The input can be provided to one or both the first and second applications 14 and 16 dependent on the one or more locations of the input area 22 effectively identified when the input is received and/or the manner of receiving (or entering) the input.

In accordance with another aspect of the invention, the input area 22 (shown in FIG. 1A) can resemble or approximate the shape of the first scene 30. This allows input to be provided in a more intuitive manner as a person (or human being) can easily associate the input area 22 with the scene 30 typically displayed in connection with an application. The benefits of such arrangement become readily apparent for a gaming application where typically one or more game objects (e.g., a ball, a gun, a car) are effectively controlled (e.g., moved) in a game scene. As such, gaming applications are further discussed below in greater detail.

Figure 1B:
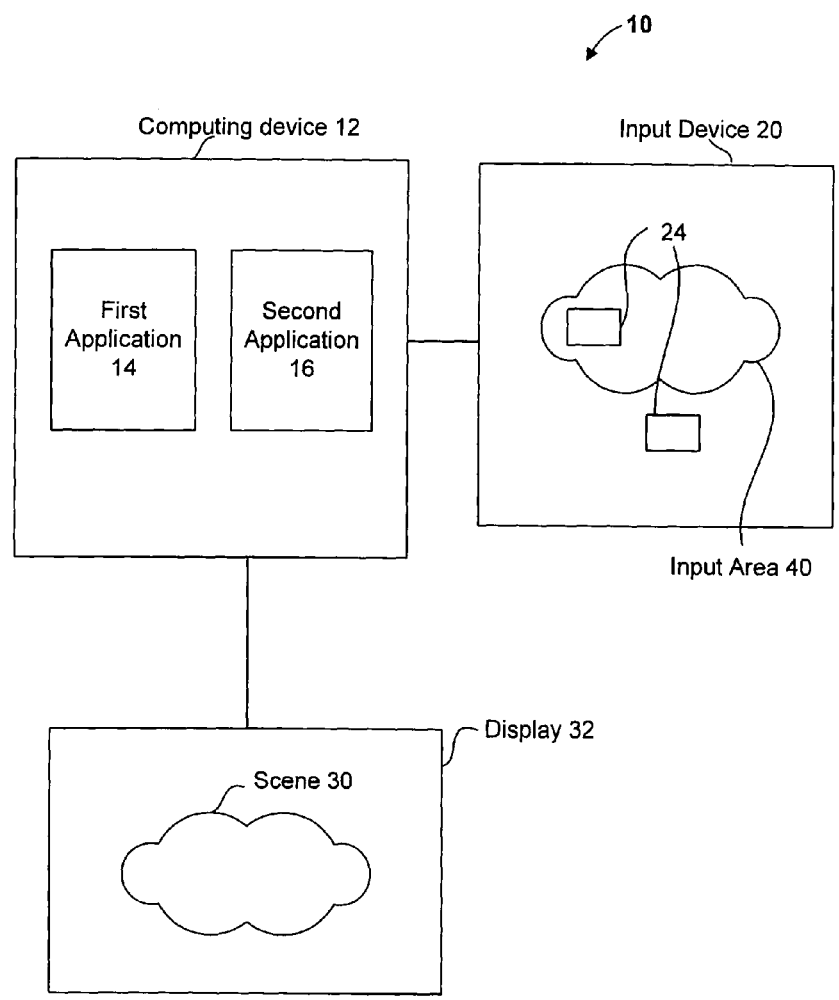
FIG. 1B depicts an input area (surface or plane) that resembles or approximates the scene associated with a first application in accordance with one embodiment of the invention.

To further elaborate, FIG. 1B depicts an input area (or surface) 40 that resembles or approximates the scene 30 associated with a first application 14 (e.g., gaming application). Referring to FIG. 1B, it is apparent that the scene 30 can be visually mapped to the input area 40. As a result, input associated with the first application 14 can be provided in a more intuitive manner (e.g., by touching various points or positions of the input area 40 that correspond to various points or positions of the scene 30).

It should be noted that one or more locations (e.g., points, positions, portions, regions) 24 of the input area 40 can also be used to provide input for the second application 16. Generally, input for the second application 16 can be provided by interacting with a designated location (e.g., 24) of the input area 40 and/or by providing input in a particular manner (e.g., pressing down).

Figure 1C:
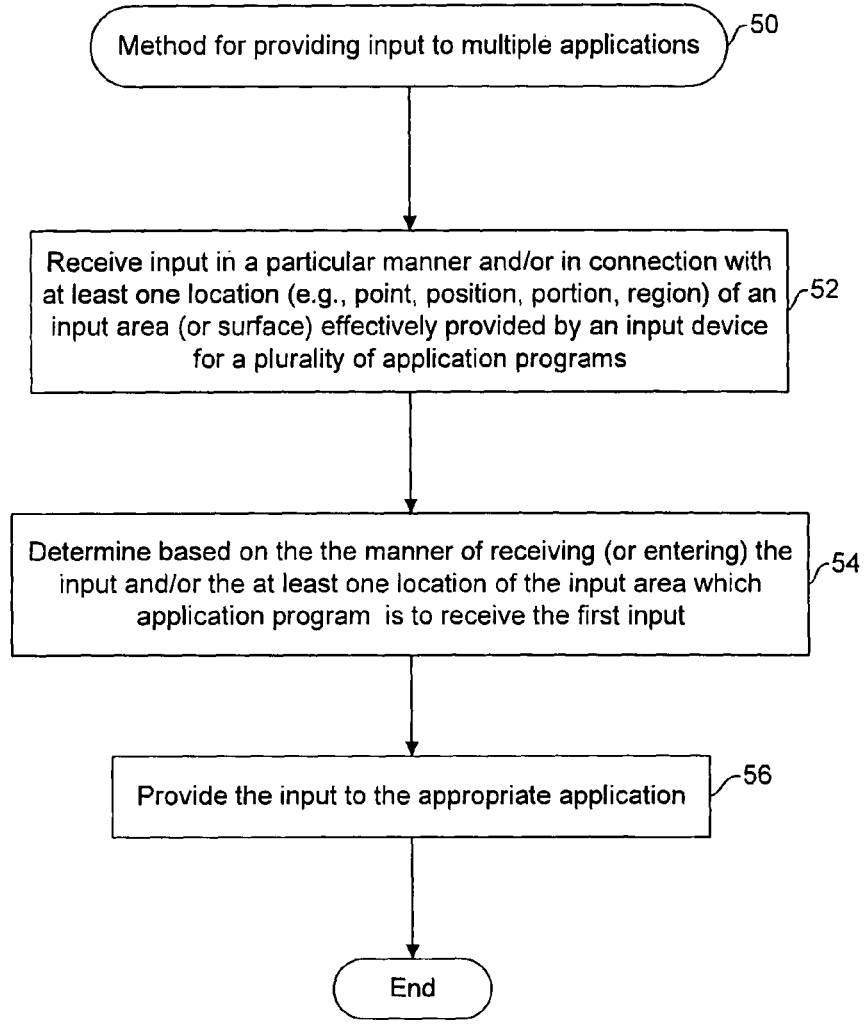
FIG. 1C depicts a method for providing input to multiple application programs (or applications) using an input device in accordance with one embodiment of the invention.

FIG. 1C depicts a method 50 for providing input to multiple application programs (or applications) using an input device in accordance with one embodiment of the invention. The input device can, for example, be the input device 20 (shown in FIG. 1A). In any case, the input device effectively provides an input area (or surface) for entering input is for multiple active applications. Referring to FIG. 1C, initially, input is received (52). It should be noted that the input is received (or entered) in a particular manner (e.g., press, touch, rub, tab) and/or in connection with at least one location (e.g., a point, position, portion, or region) of the input area. Next, it is determined, based on the manner of receiving (or entering) the input and/or the at least one location of the input area effectively identified by the input, which one of a plurality of applications is to receive the input. Thereafter, the input is provided (56) to the appropriate application. The method 50 ends after input is provided (56) to the application determined (54) to be the appropriate application for receiving the input.

Figure 1D:
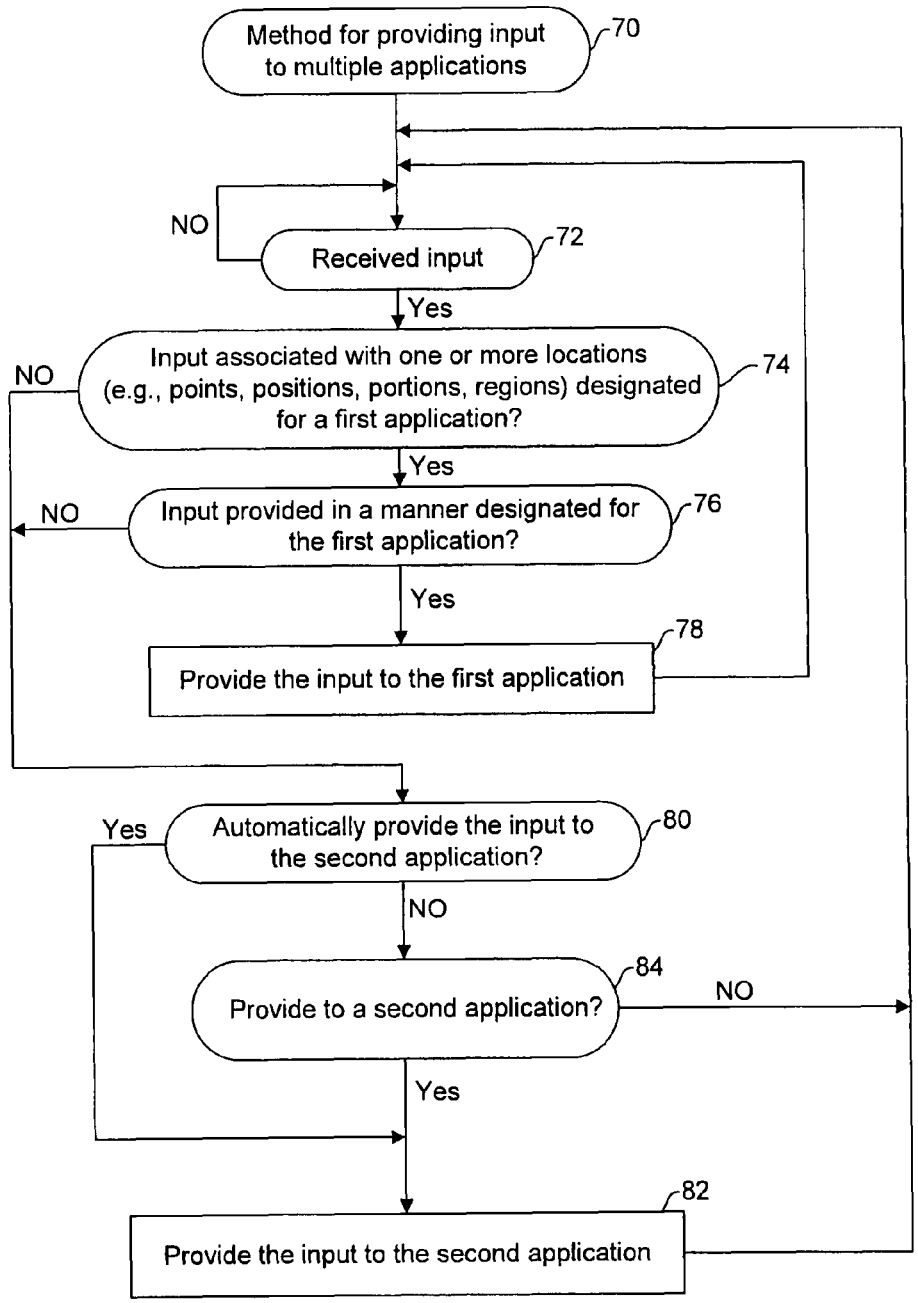
FIG. 1D depicts a method for providing input to multiple application programs (or applications) in accordance with another embodiment of the invention.

FIG. 1D depicts a method 70 for providing input to multiple application programs in accordance with another embodiment of the invention. Initially, it is determined (72) whether input has been received. If it is determined (72) that input has been received, it is next determined (74) whether the input is associated with one or more locations (e.g., points, positions, portions, regions) of an input area (or surface) designated for a first application. If it is determined (74) that the input is associated with one or more locations designated for the first application, it is then determined whether the input is provided (received or entered) in a manner designated for the first application. In effect, if it is determined (74) that the input is associated with one or more locations designated for the first application and it is determined (76) that the input is provided in a manner designated for the first application, the input is provided (78) to the first application. It should be noted that the order in which the determination (74) and (76) are made may be interchangeable or only one of them may be necessary to determine whether to provide input to the first application. As one example, a system can, for example, be configured to send all input provided in a particular manner to a first application and/or all input associated with one or more particular locations to the first application. Those skilled in the art will understand other variations.

Referring back to FIG. 1D, if it is determined (74) that the input is not associated with one or more locations for the first application or it is determined (76) that input is not provided in a manner designated for the first application, it is determined (80) whether to automatically provide the input to a second application. As such, the input can be provided (84) to the second application and the method 70 can proceed to determine (72) whether another input has been received. Again, those skilled in the art will appreciate many other variations and will readily know that the determination (80) can represent a design or programming choice. More specifically, a choice of whether to automatically send input to the second application. Alternatively, additional checks can be made to determine (84) whether to send the input to the second application. By way of example, based on the manner and/or one or more locations associated with the input, it can be determined (84) whether to provide (82) the input to the second application (or third application), and so on. Accordingly, if it is determined (84) to provide the input to the second application, the input is provided (82) to the second application. Thereafter, it is determined (72) whether input has been received and the method 70 proceeds in a same manner as described above to receive other input (72) and provide it to the appropriate application.

FIG. 2A depicts a computing environment 100 in accordance with one embodiment of the invention. Referring to FIG. 2A, a computing system (or device) 102 effectively provides functionality labeled as an input component (or module) 104. More particularly, the input component 104 effectively provides or generates an input area 110 associated with a scene or area 108 displayed on a display 103. The scene 108 can, for example, be a part of a complete game scene displayed for a gaming application. As such, the scene 108 typically includes at least one object (e.g., ball, racket, gun, car) 113 that is controlled or manipulated (e.g., moved) when the first application 106 is being executed, for example, during game play. The object 113 can be displayed within and/or on a boundary of the scene 108 displayed on the display 103. It should be noted that although the display 103 is depicted as a separate component, it can be a part of the computing system 102 and/or configured for the computing system 102. Also, it will be appreciated that the input area 110 can include or can be effectively provided by an input device 105 (e.g., touch/control pad, touch screen) which interacts with the input component or module 104. The input area 110 can also be a virtual area or an area mapped to empty space where, for example, motion is detected by one or more motion detectors. In any case, the input area 110 resembles or approximates the scene 108 where one or more game objects 113 are to be controlled. Further, input provided can typically identify one or more locations (e.g., points, positions, portions, regions) of the input area 110 and/or can be received (or entered) in a particular manner (e.g., press, touch).

Such input can, for example, be associated with movement between first and second locations of the input area 110. As another example, input can be characterized as positional input that identifies or indicates a single location of the input area 110. In general, input identifies or indicates one or more locations of the input area 110. Referring to FIG. 2A, input can, for example, be entered by a thumb or finger 111 as positional input (e.g., by touching or tapping a particular location 115 of the input area 110 effectively provided (e.g., as a part of a touchpad or touch screen). As another example, input can be characterized as directional movement (including rotational movement) entered by the thumb or finger 111 in various directions and between various locations of the input area 110. Referring to FIG. 2A, the directional movement of the thumb or finger 111 in the input area 110 is effectively mapped to movement of the game object 113 in the scene 108. As another example, "positional" movement of the thumb or finger 111 at location 115 effectively moves or places the game object 113 at corresponding location of the scene 108.

Although the examples shown in FIG. 2A demonstrate mapping input received in the input area 110 to movement of an object 113 in the scene 108, it will be appreciated that objects can be effectively controlled or manipulated in numerous other ways based on the input received by the input area 110. For example, positional input at location 115 of the input area 110 can effectively identify or select a particular game object at a corresponding location in the scene 108. The object can then be controlled (e.g., deleted, moved or modified) by default and/or based on subsequent positional and/or directional input. As such, it is possible to implement various other functions besides movement of objects. In general, a scene and/or one or more objects can be controlled or manipulated based on positional and/or directional input. However, for simplicity and ease of illustration, moving game objects in response to input received in a game area that effectively resembles or approximates a game area (or scene) will be described in greater detail below.

Referring back to FIG. 2A, non-gaming locations (e.g., points, positions, or regions) 132 and 134 are also shown in the input area 110. It will be appreciated that the non-gaming locations 132 and 134 can be designated for receiving input not directly connected to the game being played and/or game area (or scene) 108 being displayed. As such, locations 132 and 134 can be used to provide input for applications other than the game being played. Nevertheless, the locations 132 and 134 can still be part of the input area 110 and/or overlap with the input area 110, and as such, also used for playing a game (i.e., can receive directional and/or positional input for the game). In other words, the thumb or finger 111 can effectively use the game input area 110 to control both a game and a non-gaming application (e.g., a media player). By way of example, pressing or pushing on location 132 can be interpreted as input for a non-gaming application, but a tap or touch on the same location 132 can be interpreted as positional input provided for the game and used to manipulate the scene 108. However, a directional input (or movement) of the thumb or finger 111 over the location 132 (without pressing down) can be interpreted and provided as directional input for controlling the game if a pressing action of the location 132 is not detected.

Figure 2B:
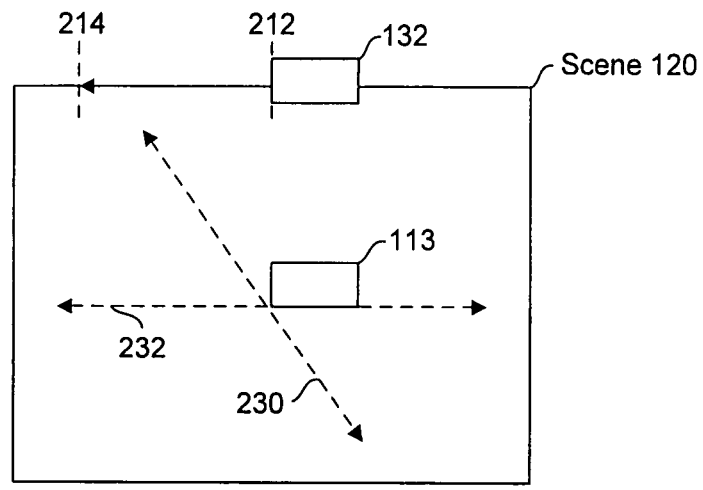
Figure 2B:
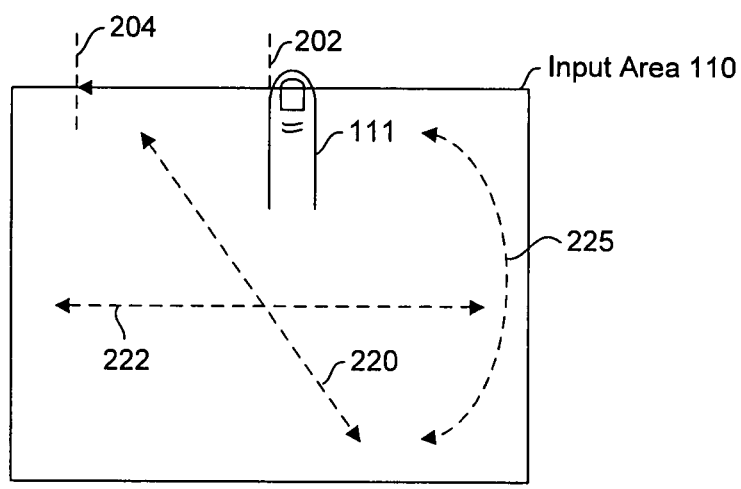

To further elaborate, FIG. 2B depicts an input area 110 and a game scene (or area) 120 in accordance with one embodiment of the invention. Referring to FIG. 2B, a thumb or finger 111 can effectively input a directional movement (e.g., right to left, left to right). In response to the directional movement, a game object 132 is effectively controlled in the scene 120. More particularly, based on the directional movement input by the thumb or finger 111, the game object 113 is effectively controlled (e.g., moved). By way of example, directional movement between locations 202 and 204 of the input area 110 can be effectively transformed to movement of the object 132 between locations 212 and 214 of the scene 120. The locations 212 and 214 can, for example, correspond to the locations 202 and 204 of the input area 110. However, it should be noted that the directional movement can be interpreted in accordance with much more complex formulas. For example, factors including the distance between locations 202 and 204, the time it takes to complete the movement between them can be used to additionally determine the speed and/or acceleration for moving the object 113. Further, directional movement can, for example, set the object 113 in motion until another input is received and/or a boundary of the scene 120 is reached.

In general, those skilled in the art will appreciate that directional input provided in the input area 110 can be interpreted or effectively mapped to one or more actions, operations, method, or functions that are performed or invoked for an object and/or on its behalf. By way of example, in a gaming environment, an object representing a gun can be "fired," or "explode". Again, for simplicity, the following examples, only illustrate movement of the objects, but those skilled in the art will appreciate that virtually any action or operation can be implemented, for example, by defining methods or functions for various objects used by an application program. It should be noted that the positional or directional input (or movement) can also be received in the interior of the input area 110. Referring to FIG. 2B, line 220 and 222 demonstrate directional movement in the interior of input area 110 which can, for example, cause movement of the game object 113 along the corresponding lines 230 and 232 of the game scene (or area) 120. As also shown, input can be received as rotational input 225 in clockwise or counter clockwise directions.

Figure 2C:
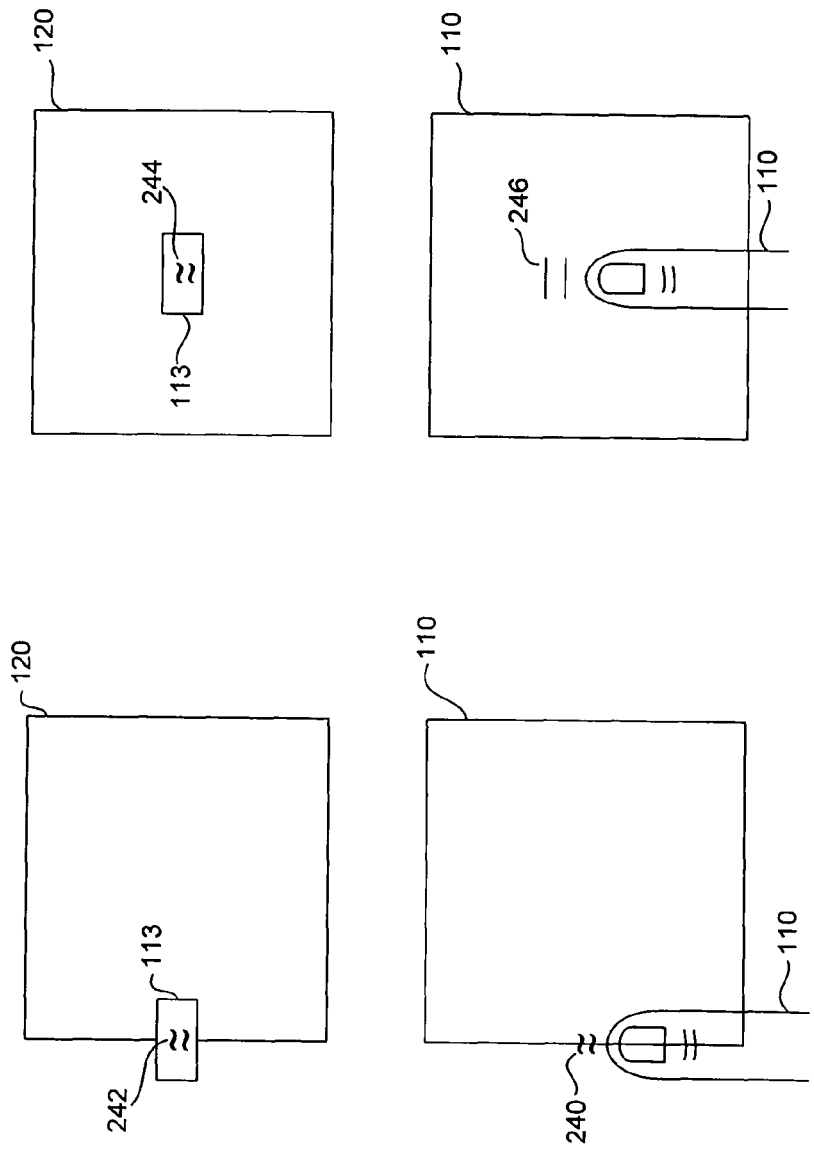

Referring now to FIG. 2C, entering positional input is depicted in accordance with one embodiment of the invention. More specifically, positional input is effectively provided by the finger or thumb 111 in the input area 110. Generally, the positional input can be characterized as input that includes or effectively indicates a location (e.g., point, position, portion, region) of an input area. As such, positional input can be defined to be different from directional movement. By way of example, positional input can be defined as a tap or touch (e.g., coming in contact with an input device and/or its surface, plane or area for a predetermined amount of time). On the other hand, directional input can, for example, be defined as movement between two or more locations. Both directional and positional input can be further distinguished from a press (or push) associated with a sufficient amount of pressure exerted on an input area. Referring to FIG. 2C, positional input at location 240 can cause a game object 113 to move to (or appear) at a corresponding location 242 of the game area (or scene) 120. Similarly, positional input provided at location 246 can cause the object 113 to move to a corresponding location 244.

Figure 2D:
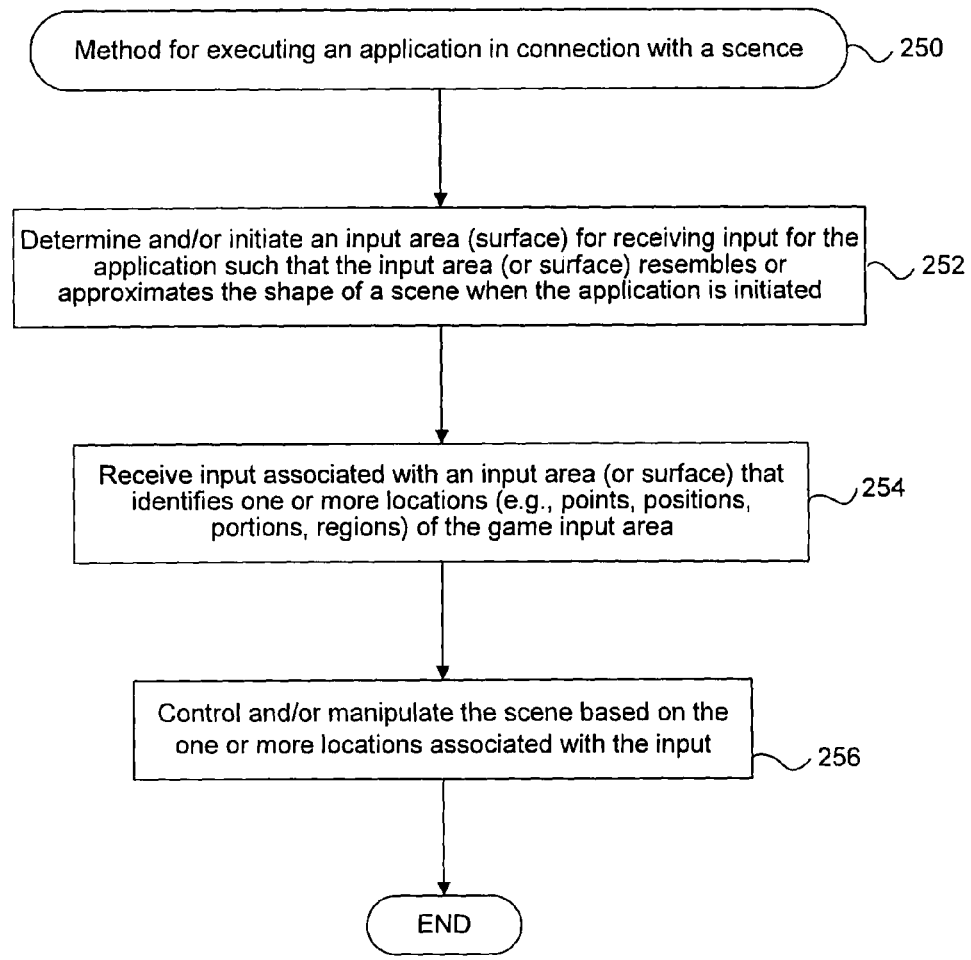
FIG. 2D depicts a method for executing an application program (or application) in connection with a scene in accordance with another embodiment of the invention.

FIG. 2D depicts a method 250 for executing an application program (or application) in connection with a scene in accordance with another embodiment of the invention. The application can, for example, be an interactive program (e.g., a game) requiring input to be entered in connection with a scene (e.g., a game scene). In any case, an input area (or surface or plane) is determined and/or effectively initiated (252) for receiving input for the application. It should be noted that the input area can resemble or approximate the shape of a scene displayed in connection and/or for the application when the application is initiated or being executed. The input area may effectively have a fixed or predetermined shape. Alternatively, the input area may be determined in a dynamic manner and/or change as the shape of the game scene changes in order to more closely approximate the current game scene. In any case, after the input area has been determined and/or initiated (252), input associated with the input area is received (254). The input is associated or effectively identifies one or more locations (e.g., points, positions, portions, regions) of the input area. Subsequently, the scene is controlled and/or manipulated (256) based on the one or more locations associated with the input and/or the manner input was received, and the method 250 ends. It should be noted that input can also be received (or entered) in a particular manner. Moreover, the manner in which the input is received can also be used to control and/or manipulate the scene.

Figure 3A:
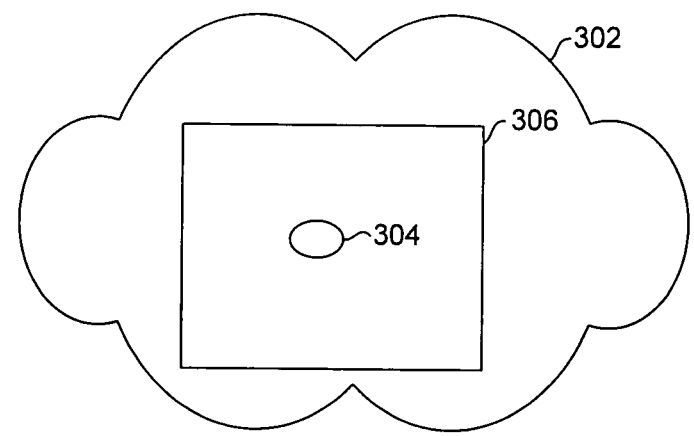
FIGS. 3A-B depict game scenes in accordance with one or more embodiments of the invention.
Figure 3A:
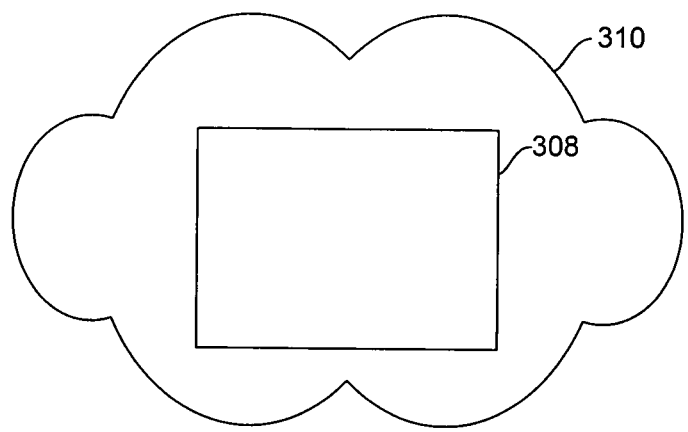

It will be appreciated that an input device can be physically shaped to resemble a game scene or at least a part of a game scene where one or more game objects are to be controlled. It is also possible to effectively generate an input area (or surface) that resembles a game scene where one or more game objects are controlled without requiring the input device to actually (or physically) be shaped like the scene. Referring to FIG. 3A, a game scene 302 can have virtually any shape 302. One or more game objects 304 can be controlled within the game scene 302 in an area 306. The area 306 is effectively mapped to an input area 308 provided by a physical device 310 (e.g., input device) that may have virtually any shape.

Figure 3B:
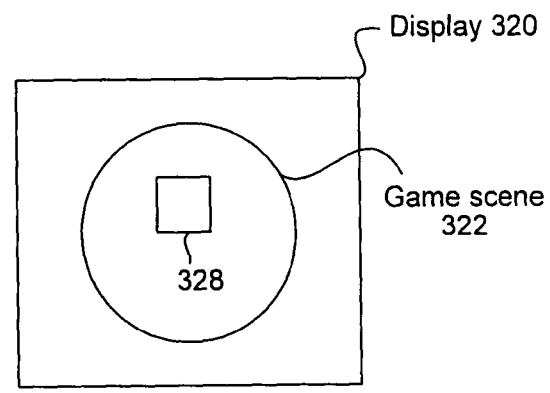
Figure 3B:
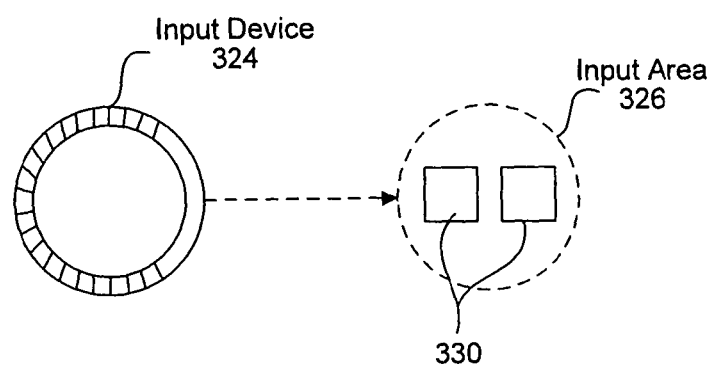

FIG. 3B depicts an input device 324 that resembles a game scene 322 displayed on a display 320 in accordance with one embodiment of the invention. During the game, one or more game objects 328 are controlled based on input received by the input device 324. The input device 324 can, for example, be embedded in a portable computing system (e.g., phone, media player). In any case, the input device 324 effectively provides an input area or surface 326 (e.g., an upper surface) that resembles the game scene 322. From the perspective of a human user, input can be provided intuitively partly because the input area 326 can be easily matched with the game area 322. In addition, the game input area 326 (e.g., upper surface of the input device 324) can be used by the user to enter input for multiple applications. More particularly, the user can interact with one or more non-gaming locations (e.g., buttons) 330 of the input area 326 in order to control a non-gaming application (e.g., media player).

Figure 3C:
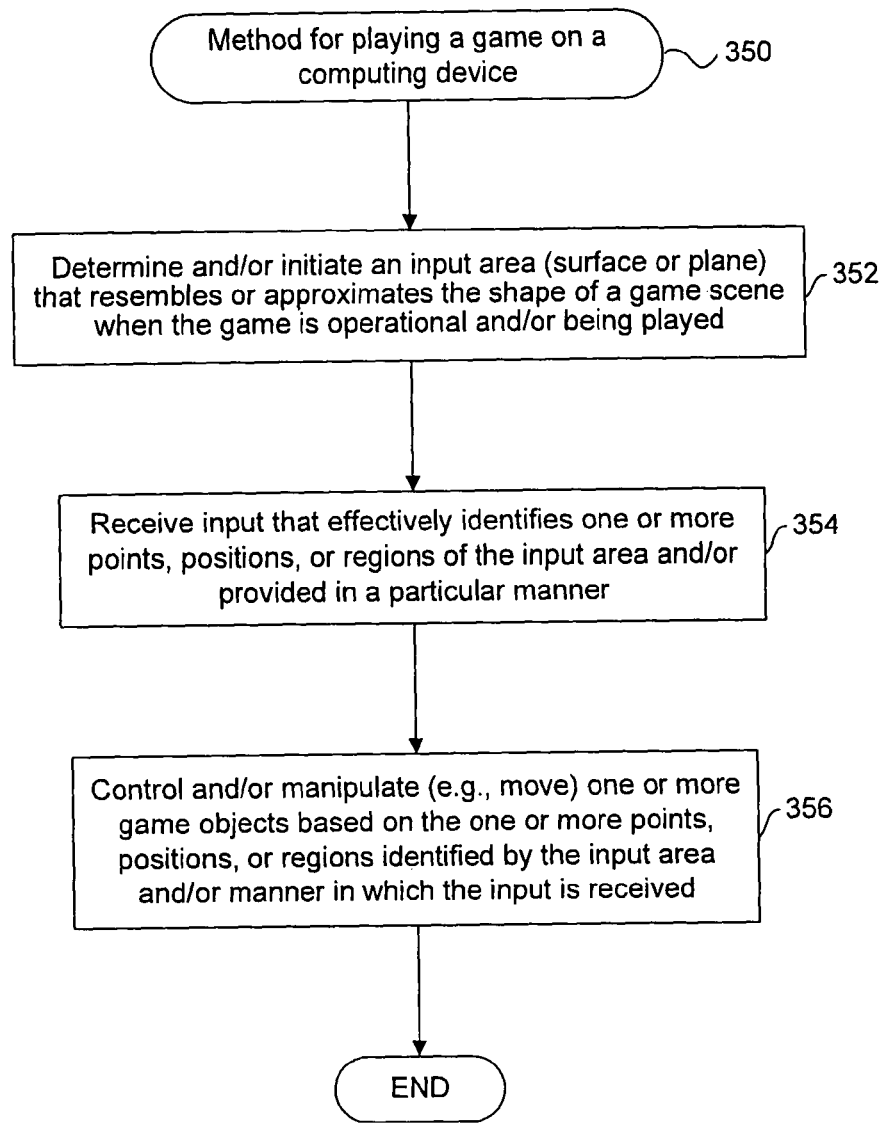
FIGS. 3C-D depict a method for playing a game on a computing device in accordance with one embodiment of the invention.

FIG. 3C depicts a method 350 for playing a game on a computing device in accordance with one embodiment of the invention. Initially, an input area (surface or plane) that resembles or approximates the shape of a game scene is determined and/or initiated (352) when the game is operational and/or being played. Next, input associated with the input area is received (354). The input effectively identifies one or more locations (e.g., points, positions, portions, regions) of the input area and/or is received in a particular manner. Thereafter, one or more game objects are controlled and/or manipulated (356) based on the one or more locations of the game scene identified by the input and the method 350 ends.

Figure 3D:
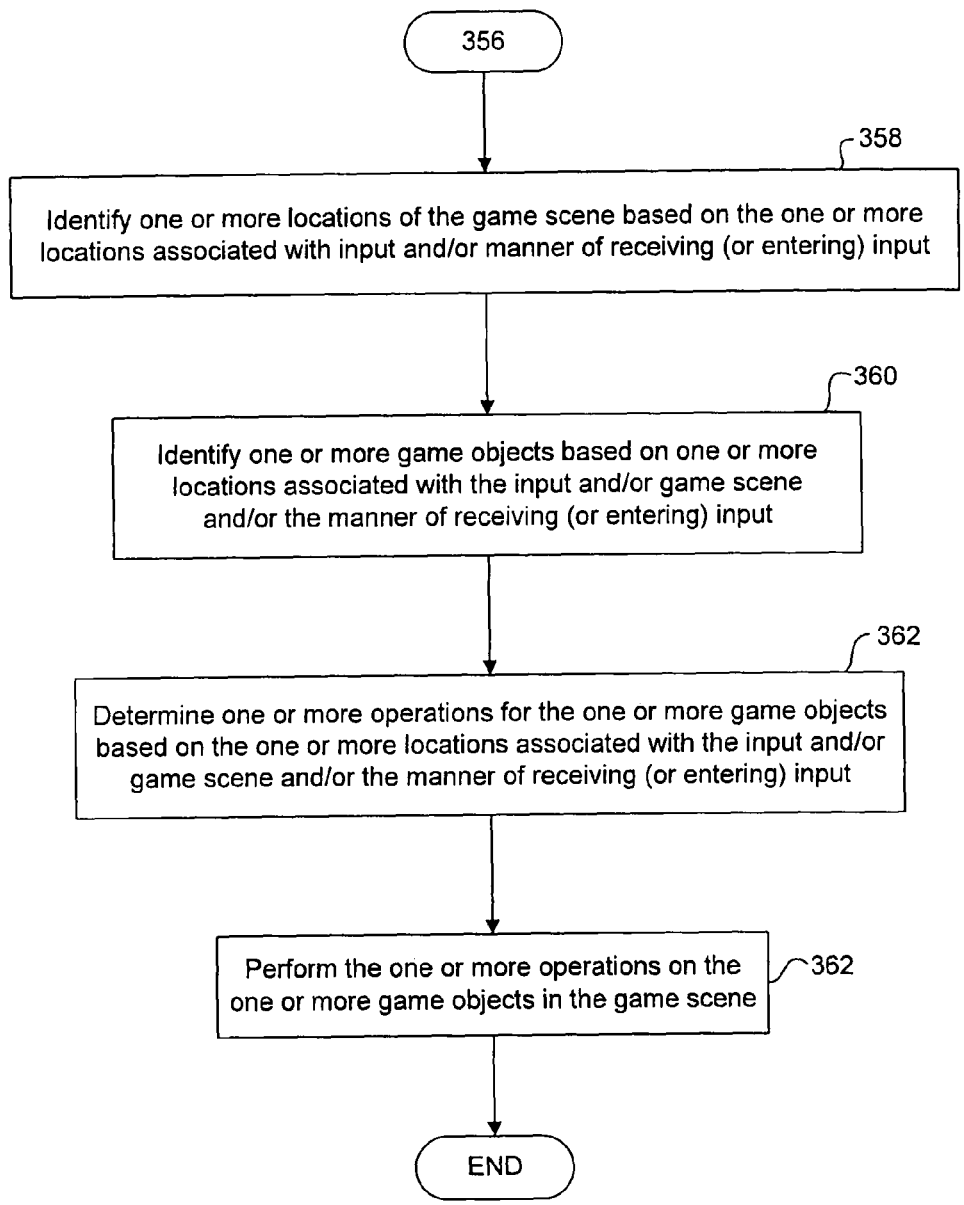

Those skilled in the art will appreciate that game objects can be controlled and/or manipulated based on various factors and techniques. A few exemplary operations are discussed below with reference to FIG. 3D. It should be noted that one or more of these operations can be used in block 356 of the method 350 illustrated in FIG. 3C depending on the desired system configuration. Referring to FIG. 3D, one or more locations of the game scene can be determined based on one or more locations identified by the input and/or the manner of entering (or receiving) the input. Next, one or more game objects are identified (360). These objects can, for example, be displayed in the game scene. The objects are identified (356) based on the one or more locations associated with input and/or corresponding locations of the game scene and/or manner of receiving (or entering) input. Thereafter, one or more operations are determined (362) to be performed on the one or more game objects. These operations can also be determined based on the one or more locations associated with input and/or game scene and/or manner input was received (or entered). Accordingly, one or more operations are performed (362) and the method 356 ends.

Figure 4A:
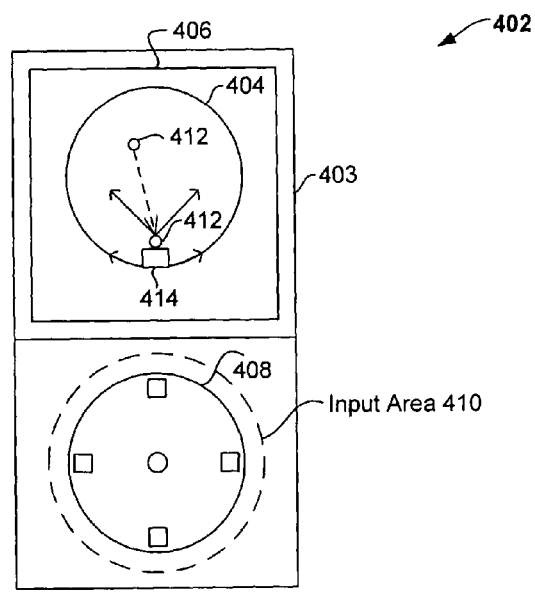
FIG. 4A depicts a computing device in accordance with one embodiment of the invention.

To further elaborate, FIG. 4A depicts a computing device 402 in accordance with one embodiment of the invention. The computing device 402, can, for example, be a mobile device (e.g., a portable media player, mobile phone). The computing device 402 has a housing 403 that includes a display 406 and an input device 408. A game scene (or area) 404 is displayed on the display 406 configured for the computing device 402. It should be noted that the circular game scene (or area) 404 resembles the shape of the input device 408 which effectively provides an input area 410. During the game, objects 412 and 414 are effectively controlled based on input provided by a person who interacts with the input device 408 and in effect the input area 410. In one embodiment, game objects 412 and 414 respectively mimic the behavior of a ball and bat. Hence, the "ball" 412 can fall toward the "bat" 414, be "hit" by the "bat" 412 to bounce back in an opposite direction. During game play, the "bat" 414 can be moved around the circumference of the game scene 404 which resembles a circle. The "Bat" 414 is used to hit the "ball" 412 based on various factors (e.g., angle of contact, velocity of the bat or ball). For simplicity and ease of illustration, the input provided by a person can, for example, merely control (e.g., move) the "bat" 414 so that it can "hit" the "ball" 412 as it bounces back and forth in various directions and between various locations in the game scene 404. It will be appreciated that a person can conveniently use the input area 410 effectively provided by the input device 408 to control the movement of the "bat" 414 around the circumference of the circle 404. More particularly, rotational input can be used to effectively move the "bat" 414 around the circular game scene.

Figure 4B:
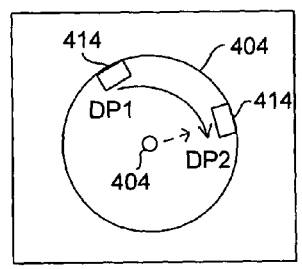
FIGS. 4B-C depict entering input area in accordance with one or more embodiments of the invention.
Figure 4B:
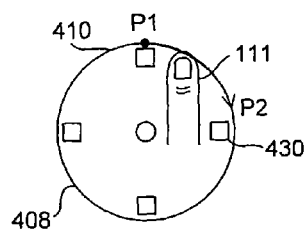
Figure 4C:
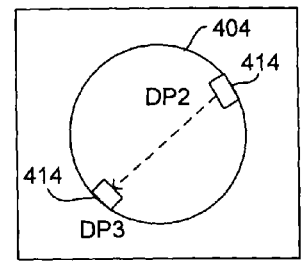

To further elaborate, FIGS. 4B and 4C depict entering inputs in accordance with embodiments of the invention. More particularly, FIG. 4B depicts entering a directional movement as rotational movement from a first position (P1) to a second position (P2) using a thumb or finger 111 to interact with the input device 408.

Referring to FIG. 4B, in response to the rotational movement (P1-P2) around or along the circumference or edge of the input area 410 (or input device 408), the "bat" 414 moves between the corresponding locations DP1-DP2 of the game scene 404. It will be appreciated that when the "ball" 414 is, for example, at location DP2, the person can enter a positional input that effectively moves the "bat" object 414 to a third position (DP3). Referring to FIG. 4C, a thumb or finger 111 can input a positional input, for example, by a tap or touch at position P3 to effectively move the "bat" object 414 from location DP2 to location DP3. Hence, the person can use a combination of rotational and positional input to intuitively control the movement of the "bat" 414 in order to play the game.

It should also be noted that functions not directly related or connected to the game can also be provided, for example, by one or more locations 420 and 430 that are effectively activated by the finger or thumb 111. By way of example, a location 420 (shown in FIG. 4C) can be a physical button or an area on a touch surface configured to be pressed or pushed by a pressing or pushing action in order to control a function (e.g., pause, play, next, back) associated with a media player. Referring to FIG. 4C, one or more locations 420 and 430 can also be designated for non-gaming functions (e.g., input provided to a media player for playing music). By way of example, a pressing input on location 430 can be effectively interpreted as input for a media player. As such, the thumb or finger 111 can press on the location 430 (e.g., press a physical button or a designated area on a touch surface) to control a media player. Again, it should be noted that the location 430 can still be part of the input area 410 provided for gaming as it is possible to enter gaming input using rotational and positional inputs without activating a non-gaming functionality (i.e. by not pressing on the location 430). Also, it is possible to designate, for example, a location 431 for game play regardless of the manner input is entered. For example, a press or push on location 431 can cause a game action (e.g., cause the bat 414 to hit harder).

Figure 4D:
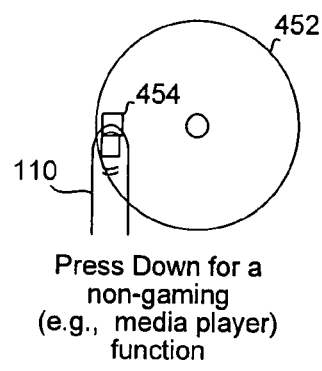
FIGS. 4D-F depict an input area in accordance with one embodiment of the invention.
Figure 4E:
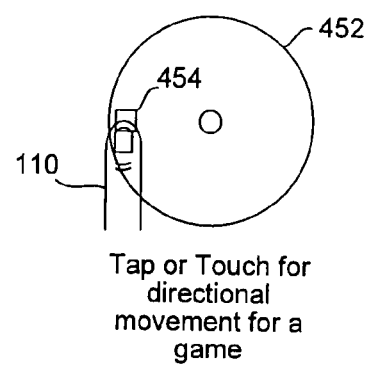
Figure 4F:
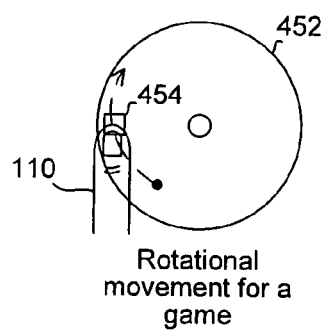

To further elaborate, FIGS. 4D, 4E and 4F depict an input area 452 in accordance with one embodiment of the invention. Input area 452 includes a location 454 designated for receiving input for both a gaming and a non-gaming application. Referring to FIG. 4D, a thumb or finger 111 can press down on the location 454 to effectively provide input to a non-gaming application, for example, a media player in (e.g., start or stop the music being played during the game). However, referring to FIG. 4E, a tap or touch of the position 454 by the finger or thumb 111 effectively provides positional input for a gaming application. It should be noted that the positional input can be on or over the location 454 without sufficient pressure to cause a pressing or pushing action to be detected. Referring to FIG. 4F, a rotational movement can touch (or go over) the designated location 454 without sufficient pressure, so as to provide a rotational input to the gaming application.

Figure 4G:
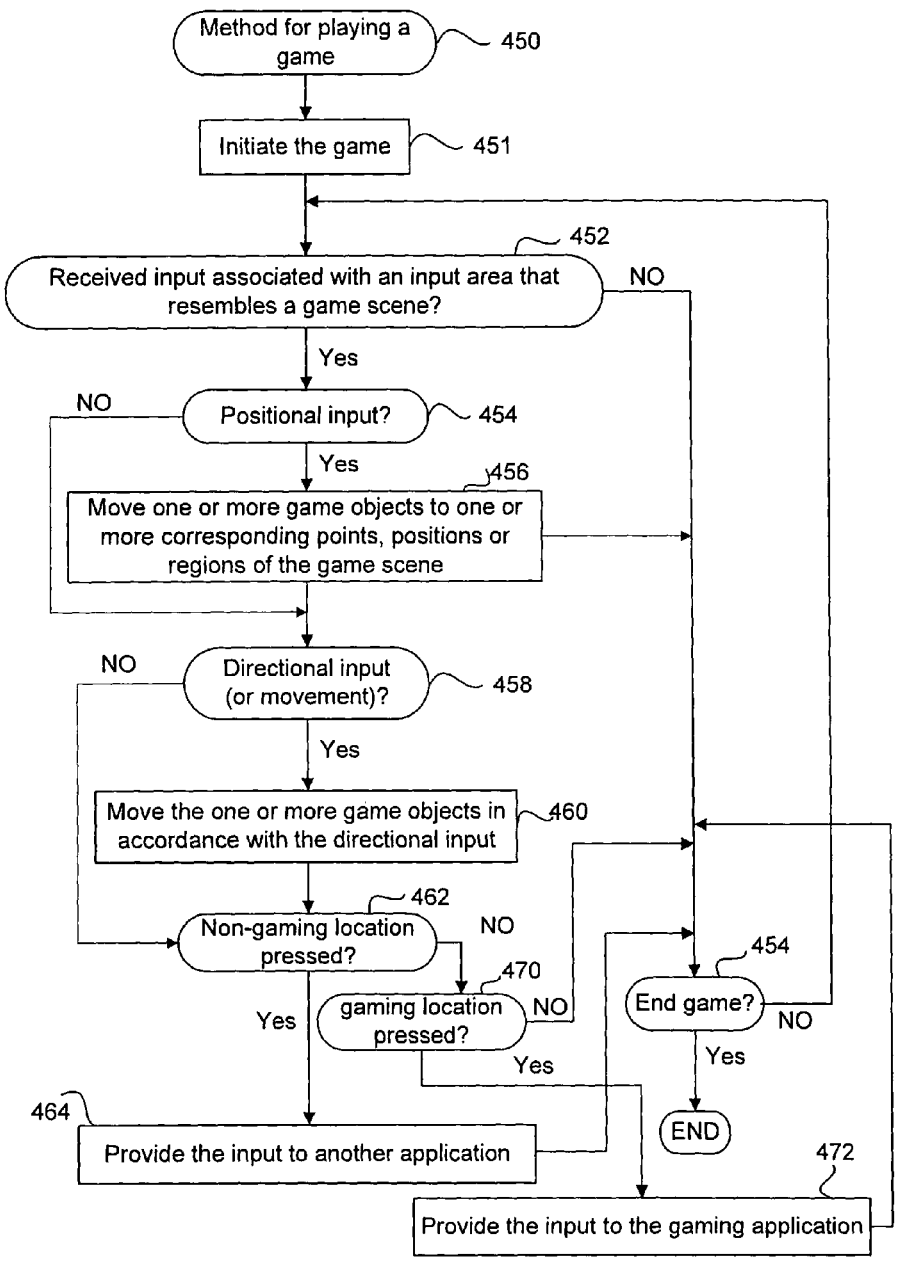
FIG. 4G depicts a method for playing a game using an input device that effectively provides an input area that resembles a game scene in accordance with one embodiment of the invention.

FIG. 4G depicts a method 450 for playing a game using an input device that effectively provides an input area resembling the shape of a game scene in accordance with one embodiment of the invention. Initially, the game is initiated (451). Next, it is determined whether input associated with the input area resembling the game scene is received (452). If it is determined (452) that input is not received, it is determined (454) whether to end the game and the method 450 can end accordingly. In effect, the method 450 can wait for input or a determination (454) to end the game (e.g., by receiving a request or indication to end the game.

If it is determined (452) that input has been received, it is determined (454) whether the input is positional (positional input). If it is determined (454) that the input is positional, one or more game objects can be moved (456) to one or more corresponding locations (e.g., points, positions, portions, regions) of the game scene in response to the positional input. However, if it is determined (454) that the input is not positional input, it is determined (458) whether the input is directional (e.g., rotational) input (or movement). Consequently, one or more game objects can be moved (460) in accordance with the directional input (or directional movement). By way of example, a game object can be moved in the same direction and in a manner that mimics the directional input (or movement). On the other hand, if it is determined that input is neither directional (458) nor positional input (454), it is determined (462) whether the input is associated with a non-gaming location (e.g., a location designated for applications other than the gaming application) of the input area that has been pressed (or pushed). For example, one or more buttons or selected regions of the input area can be reserved to effectively provide input and/or control another application (e.g., a media player).

Accordingly, if it is determined (462) that a non-gaming location of the input area has been pressed (or pushed), the input is provided (464) to another application (e.g., a non-gaming application such as a media player). After the input has been provided (464), it is determined (454) whether to end the game and the game can end accordingly. However, if it is determined (462) that a non-gaming location is not pressed, it is determined (470) whether a gaming location has been pressed. For example, one or more buttons provided in the input area and/or selected regions of the input areas can be reserved as one or more gaming locations for the gaming application. In addition to positional and directional input mechanisms, this provides yet another convenient mechanism for providing input to the gaming application. As such, if it is determined (470) that a gaming location has been pressed, the input is provided to the gaming application. It should be noted that if it is determined (470) that a gaming location has not been pressed, it is determined (454) whether to end the game. Although not depicted in FIG. 4G, those skilled in the art will appreciate that error-checking can also be performed to effectively verify the input. The method 450 ends when it is determined (454) to end the game.

It will be appreciated that the directional and positional input are useful for implementing numerous functions and applications. Directional and positional input can be used in combination with an input area that resembles a game scene allows a person to enter input more intuitively, thereby allowing games to be played in a more convenient manner. Further, directional and/or positional input can be used to implement functionalities which are be difficult to implement using conventional techniques. By way of example, directional and/or positional input can be provided to effectively select or identify a number within a relatively large range as required for various gaming applications. This range can, for example, represent money available for betting in a poker game. Generally, identifying or selecting a number within a relatively large range poses a difficult problem if the actual number is not specifically entered (e.g., by using a keyboard to enter the number).

Figure 5:
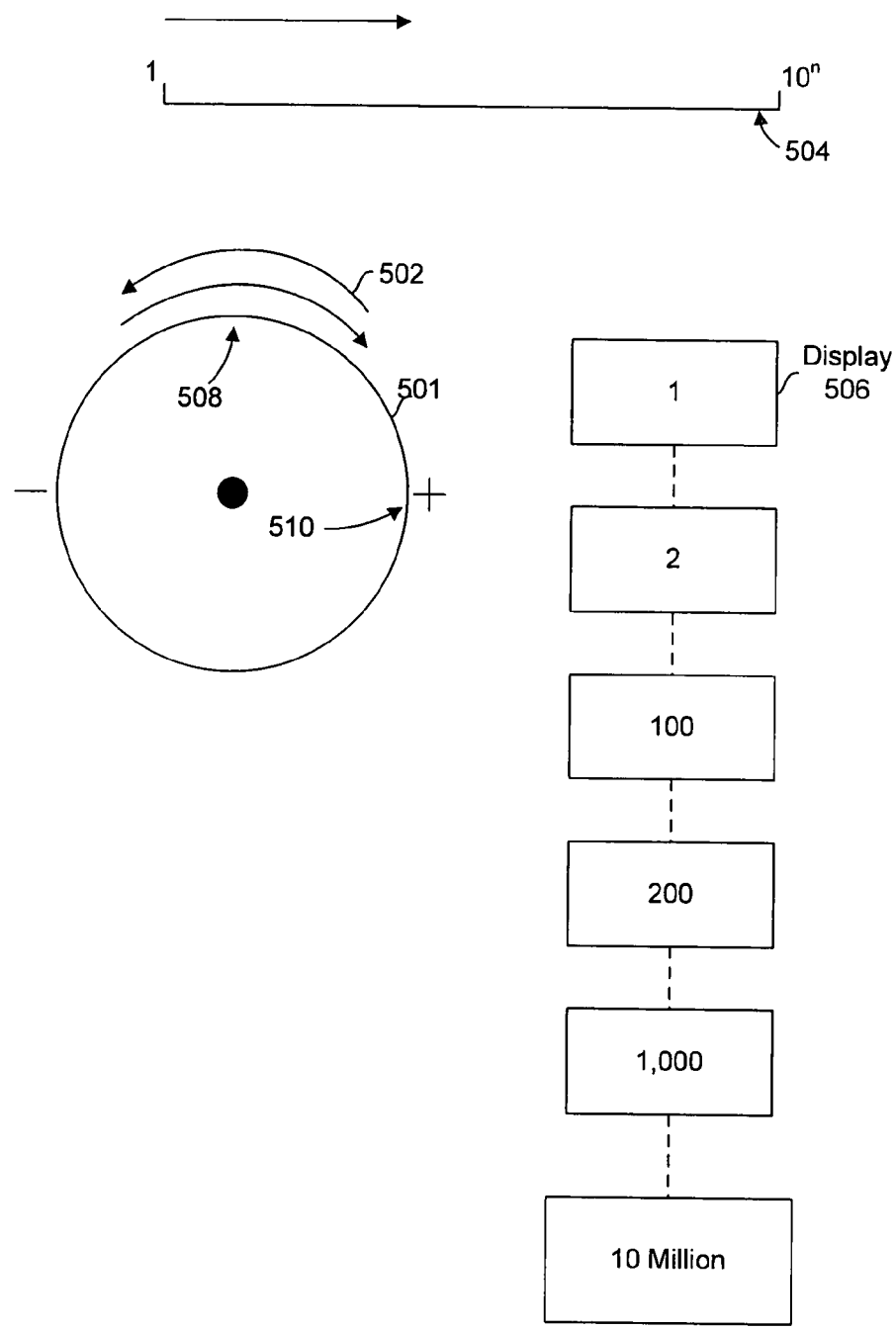
FIG. 5 depicts a rotational movement that can be used to indicate a number within a larger range in accordance with one embodiment of the invention.

Referring to FIG. 5, rotational input or movement 502 can be used to indicate a number within a larger range 504 (e.g., 1 to 10", where n≥6). Those skilled in the art will appreciate that one or more factors including: the direction, distance traveled, speed and acceleration associated with a directional input or movement can be used to effectively determine a number within the range 504. By way of example, a relatively slow rotational movement over a relatively small distance may indicate incrementing by one (1) which would result in updating a number provided and displayed on a display 506 (e.g., updating the number displayed by one). Accordingly, rotational input can be used to effectively increment by one (1) to reach the desired number. However, rotational input or movement 502 extending over relatively larger distances and/or provided relatively faster can be used to effectively increment by larger amounts, for example, tens or hundreds, and so on. Similarly, rotational input or movement 502 can effectively decrement in small or larger amounts. It should be noted that a "rounding off" effect can also be provided to effectively round off the selected number as deemed appropriate. By way of example, starting at number 20, relatively slower rotational movement can initially increment by one's to yield the number 27. Subsequently, relatively larger rotational movement can result in increasing the number by a relatively larger increment, namely 10. However, rather than yielding the numbers 37 and 47, the rounding off effect may result in increasing the number to 40, 50, and so on. Those skilled in the art will appreciate it that such rounding off can be implemented in accordance with various schemes and/or in consideration of the particular application or game. As such, the technique used for a particular type of poker game may differ from that used for a different type of game and/or can be customized by user depending on his or her preference.

In one embodiment, input area 501 can also represent a range. Hence, positional movement may be used to select a number within the range 504. By way of example, touching or tapping an area or region 508 can effectively select the halfway point within the range 504. Subsequently, directional movement 502 can effectively increment or decrement by ones, tens, hundreds, thousands and so on. Rotational input covering or extending over a boundary location 510 can effectively select the last number in the range (e.g., bet all the money available). Also, rotational movement may in effect start an incrementing or decrementing process that can continue as long as desired or until the end of the range 504 is reached. This process may be at a constant rate or accelerating as time goes by. For example, a right (or clockwise) rotational movement can increment by one, then effectively accelerate to increment by tens, hundreds or more. This increment can continue as long as a finger or thumb maintains contact with the input area or directional movement in the opposite direction is received, thereby allowing a person to select "1500," "25,000," or "5,000,000" effectively by entering one or more rotational movements.

It should be noted that a "filtering" mechanism can be used to effectively ignore input (e.g., small amount of rotational movement). By way of example, a relatively small amount of movement associated with initiation or termination of rotational movement can be ignored. Typically, this type of movement can be expected and accounted for when input is provided by a human being. As such, the filtering mechanism can effectively ignore movement that can be considered to be unintended and/or a byproduct of the intended rotational movement.

Figure 6:
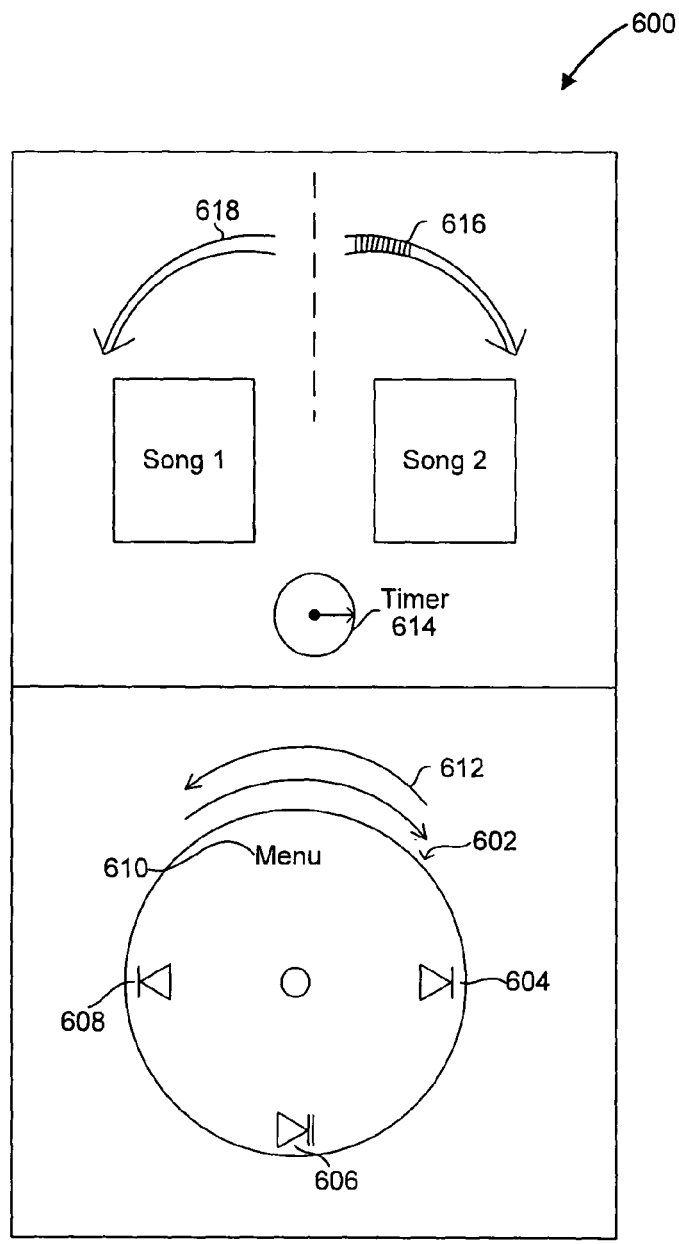
FIG. 6 depicts a media player in accordance with one embodiment of the invention.

As noted above, an input area allows input to be provided for multiple applications in accordance with one aspect of the invention. This allows for integration of various applications. One embodiment of the invention effectively integrates a media player with gaming applications. FIG. 6 depicts a media player 600 in accordance with one embodiment of the invention. The media player 600 can, for example, be provided as an Apple iPod® media player (available from Apple Computer, Inc.) that provides a media player for playing music and/or viewing media (e.g., movies). An input device 602 effectively provides a circular input area (surface or plane) extending over various designated locations 604, 606, 608 and 610 which can be implemented as selectable areas. As such, these selectable areas can be used to control the media player (e.g., pause, play, forward and backward functions for a media player) and/or media related functions, such as, for example, browsing menus or directories to select or download media files. In addition, the media player 600 also provides the ability to play music-based games. These music-based games can, for example, be used based on media content available to and/or stored by the media player 600. Hence, games can be tailored or individualized for different individuals based on digital media selected by users and/or generally familiar to them. By way of example, music files (audio digital files) stored on the media player 600 for a particular user can be used to play a music trivia game where a song is played and the person playing the game is prompted to identify the song and/or answer a question about the song (e.g., what year it was released).

Referring to FIG. 6, information about songs 1 and 2 are displayed while one of the songs is played. The user (or person) playing the game can then select one of the songs as the correct song by entering a rotational movement 612 in the direction of one of displayed songs (song 1 and 2). A timer 614 can display the time available for making the selection. A selection can be made by providing rotational and/or positional input. By way of example, a right (or clockwise) directional movement may effectively reach far enough to effectively select the second song (song 2). As another example, a relatively short directional movement to the right can effectively start the selection of song 2 as the right arrow 616 appears to become continuously filled to demonstrate the process of selecting the second song (song 2). However, directional movement 612 to the left (or counter-clockwise) can reverse the process and effectively result in filing the left arrow 618 in order to eventually cause the selection of the first song (song 1). It will be appreciated that a relatively quick and/or long directional movement 612 to the left can abruptly reverse the process of selecting the second song (song 2) and/or in effect immediately select the first song (song 1). It should be noted that while the game is being played the person playing the game can still use the selectable areas 604, 606, 608 and 610 to control the media-player. In other words, the person can play the music-based game by interacting via rotational and/or positional input and also control the music being played using a familiar interface. Furthermore, the direction, extent, and/or manner of entering rotational input can be effectively used to allow games to be played in a simple and more intuitive manner.

The following applications are hereby incorporated herein by reference in their entirety for all purposes: (i) U.S. patent application Ser. No. 11/144,541, filed Jun. 3, 2005, and entitled "TECHNIQUES FOR PRESENTING SOUND EFFECTS ON A PORTABLE MEDIA PLAYER," (ii) U.S. patent application Ser. No. 11/530,846, filed Sep. 11, 2006, and entitled "ALLOWING MEDIA AND GAMING ENVIRONMENTS TO EFFECTIVELY INTERACT AND/OR AFFECT EACH OTHER," (iii) U.S. patent application Ser. No. 11/530,767, filed Sep. 11, 2006, and entitled "INTEGRATION OF VISUAL CONTENT RELATED TO MEDIA PLAYBACK INTO NON-MEDIA-PLAYBACK PROCESSING," (iv) U.S. patent application Ser. No. 11/530,768, filed Sep. 11, 2006, and entitled "INTELLIGENT AUDIO MIXING AMONG MEDIA PLAYBACK AND AT LEAST ONE OTHER NON-PLAYBACK APPLICATION," and (v) U.S. patent application Ser. No. 11/530,773, filed Sep. 11, 2006, and entitled "PORTABLE MEDIA PLAYBACK DEVICE INCLUDING USER INTERFACE EVENT PASSTHROUGH TO NON-MEDIA-PLAYBACK PROCESSING".

The various aspects, features, embodiments or implementations of the invention described above can be used alone or in various combinations.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A portable device comprising:
   a touch screen display;
   one or more processors; and
   memory storing one or more programs, wherein the one or more programs are configured to be executed by the one or more processors, the one or more programs including instructions for:
   concurrently running a first application and a second application different from the first application;
   displaying, on the touch screen display, a user interface for the first application; and
   while displaying the user interface for the first application:
   providing an input area on the touch screen display, the input area configured to receive user touch input for the first application and to receive user touch input for the second application;
   detecting user touch input at a first location in the input area, the first location being within the displayed user interface for the first application;
   in response to detecting the user touch input, determining whether to provide the user touch input at the first location within the displayed user interface for the first application to the first application or the second application;
   in accordance with a determination that the user touch input is detected in a first manner at the first location within the displayed user interface for the first application, directing the user touch input directly to the first application; and
   in accordance with a determination that the user touch input is detected in a second manner, distinct from the first manner, at the first location within the displayed user interface for the first application, directing the user touch input directly to the second application.

2. The device of claim 1, wherein the one or more programs further include instructions for:
   while displaying the user interface for the first application:
   detecting a second user touch input at a second location different from the first location in the input area, the second location being within the displayed user interface for the first application;
   in response to detecting the second user touch input, determining whether to provide the second user touch input at the second location within the displayed user interface for the first application to the first application or the second application;
   in accordance with a determination that the second user touch input is detected in the first manner at the second location within the displayed user interface for the first application, directing the second user touch input to the first application; and
   in accordance with a determination that the second user touch input is detected in the second manner at the second location within the displayed user interface for the first application, directing the second user touch input to the second application.

3. The device of claim 2, wherein the second user touch input is directed to the first application or the second application dependent on whether the second user touch input is received at the first location or the second location and the manner in which the second user touch input is received.

4. The device of claim 1, wherein the input area enables a user of the device to provide user touch input mimicking a motion associated with at least a portion of the user interface for the first application.

5. The device of claim 1, wherein the first location comprises a scene associated with at least a portion of the user interface for the first application.

6. The device of claim 1, wherein the first manner comprises at least one of a positional input, a directional input, a rubbing input, a pressing input and a pushing input, and wherein the second manner comprises at least one of a positional input, a directional input, a rubbing input, a pressing input and a pushing input.

7. The device of claim 1, wherein the input area is a first input area, and wherein the one or more programs further include instructions for:
   displaying, on the touch screen display, a user interface for the second application; and
   while displaying the user interface for the second application:
   providing a second input area, on the touch screen display, the second input area configured to receive user touch input for the first application and to receive user touch input for the second application;
   detecting third user touch input at a location in the second input area, the location being within the displayed user interface for the second application;
   in response to detecting the third user touch input, determining whether to provide the third user touch input at the location within the displayed user interface for the second application to the first application or the second application;

in accordance with a determination that the third user touch input is detected in the first manner at the location within the displayed user interface for the second application, directing the third user touch input to the first application; and in accordance with a determination that the third user touch input is detected in the second manner at the location within the displayed user interface for the second application, directing the third user touch input to the second application.

8. A method of a portable device with a touch screen display comprising:

concurrently running a first application and a second application;

displaying, on the touch screen display, a user interface for the first application; and while displaying the user interface for the first application:

providing an input area on the touch screen display, the input area configured to receive user touch input for the first application and to receive user touch input for the second application;

detecting user touch input at a first location in the input area, the first location being within the displayed user interface for the first application;

in response to detecting the user touch input, determining whether to provide the user touch input at the first location within the displayed user interface for the first application to the first application or the second application;

in accordance with a determination that the user touch input is detected in a first manner at the first location within the displayed user interface for the first application, directing the user touch input directly to the first application; and in accordance with a determination that the user touch input is detected in a second manner, distinct from the first manner, at the first location within the displayed user interface for the first application, directing the user touch input directly to the second application.

9. The method of claim 8, further comprising, while displaying the user interface for the first application:

detecting a second user touch input at a second location different from the first location in the input area, the second location being within the displayed user interface for the first application;

in response to detecting the second user touch input, determining whether to provide the second user touch input at the second location within the displayed user interface for the first application to the first application or the second application;

in accordance with a determination that the second user touch input is detected in the first manner at the second location within the displayed user interface for the first application, directing the second user touch input to the first application; and in accordance with a determination that the second user touch input is detected in the second manner at the second location within the displayed user interface for the first application, directing the second user touch input to the second application.

10. The method of claim 9, wherein the second user touch input is directed to the first application or the second application dependent on whether the second user touch input is received at the first location or the second location and the manner in which the second user touch input is received.

11. The method of claim 8, wherein the input area enables a user of the device to provide user touch input mimicking a motion associated with at least a portion of the user interface for the first application.

12. The method of claim 8, wherein the first location comprises a scene associated with at least a portion of the user interface for the first application.

13. The method of claim 8, wherein the first manner comprises at least one of a positional input, a directional input, a rubbing input, a pressing input and a pushing input, and wherein the second manner comprises at least one of a positional input, a directional input, a rubbing input, a pressing input and a pushing input.

14. The method of claim 8, wherein the input area is a first input area, the method further comprising:

displaying, on the touch screen display, a user interface for the second application program; and while displaying the user interface for the second application program:

providing a second input area, on the touch screen display, the second input area configured to receive user touch input for the first application and to receive user touch input for the second application;

detecting a third user touch input at a location in the second input area, the location being within the displayed user interface for the second application;

in response to detecting the third user touch input, determining whether to provide the third user touch input at the location within the displayed user interface for the second application to the first application or the second application;

in accordance with a determination that the third user touch input is detected in the first manner at the location within the displayed user interface for the second application, directing the third user touch input to the first application; and in accordance with a determination that the third user touch input is detected in the second manner at the location within the displayed user interface for the second application, directing the third user touch input to the second application.

15. A non-transitory computer readable storage medium storing one or more programs, the one or more programs comprising instructions, which when executed by a portable device with a touch screen display, concurrently run a first application and a second application;

displaying, on the touch screen display, a user interface for the first application; and while displaying the user interface for the first application:

providing an input area on the touch screen display, the input area configured to receive user touch input for the first application and to receive user touch input for the second application;

detect a user touch input at a first location in the input area, the first location being within the displayed user interface for the first application;

in response to detecting the user touch input, determining whether to provide the user touch input at the first location within the displayed user interface for the first application to the first application or the second application;

in accordance with a determination that the user touch input is detected in a first manner at the first location within the displayed user interface for the first application, direct the user touch input directly to the first application; and in accordance with a determination that the user touch input is detected in a second manner, distinct from the first manner, at the first location within the displayed user interface for the first application, direct the user touch input directly to the second application.

16. The non-transitory computer readable storage medium of claim 15, wherein the instructions further cause the device to:

while displaying the user interface for the first application:
- detect a second user touch input at a second location different from the first location in the input area, the second location being within the displayed user interface for the first application;
- in response to detecting the second user touch input, determine whether to provide the second user touch input at the second location within the displayed user interface for the first application to the first application or the second application;
- in accordance with a determination that the second user touch input is detected in the first manner at the second location within the displayed user interface for the first application, direct the second user touch input to the first application; and
- in accordance with a determination that the second user touch input is detected in the second manner at the second location within the displayed user interface for the first application, direct the second user touch input to the second application.

17. The non-transitory computer readable storage medium of claim 16, wherein the second user touch input is directed to the first application or the second application dependent on whether the second user touch input is received at the first location or the second location and the manner in which the second user touch input is received.

18. The non-transitory computer readable storage medium of claim 15, wherein input area enables a user of the device to provide user touch input mimicking a motion associated with at least a portion of the user interface for the first application.

19. The non-transitory computer readable storage medium of claim 15, wherein the first location comprises a scene associated with at least a portion of the user interface for the first application.

20. The non-transitory computer readable storage medium of claim 15, wherein the first manner comprises at least one of a positional input, a directional input, a rubbing input, a pressing input and a pushing input, and wherein the second manner comprises at least one of a positional input, a directional input, a rubbing input, a pressing input and a pushing input.

21. The non-transitory computer readable storage medium of claim 15, wherein the input area is a first input area, and wherein the instructions further cause the device to:

display, on the touch screen display, a user interface for the second application; and while displaying the user interface for the second application:
- provide a second input area, on the touch screen display, the second input area is configured to receive user touch input for the first application and to receive user touch input for the second application;
- detect a third user touch input at a location in the second input area, the location being within the displayed user interface for the second application;
- in response to detecting the third user touch input, determine whether to provide the third user touch input at the location within the displayed user interface for the second application to the first application or the second application;
- in accordance with a determination that the third user touch input is detected in the first manner at the location within the displayed user interface for the second application, direct the third user touch input to the first application; and
- in accordance with a determination that the third user touch input is detected in the second manner at the location within the displayed user interface for the second application, direct the third user touch input to the second application.

* * * * *

UNITED STATES PATENT AND TRADEMARK OFFICE
CERTIFICATE OF CORRECTION

| | |
|---|---|
| PATENT NO. | : 8,933,890 B2 |
| APPLICATION NO. | : 11/882427 |
| DATED | : January 13, 2015 |
| INVENTOR(S) | : Michael D. Lampell et al. |

Page 1 of 1

It is certified that error appears in the above-identified patent and that said Letters Patent is hereby corrected as shown below:

In the Claims

In column 15, line 43, in claim 1, delete "device" and insert -- device, --, therefor.

In column 18, line 45, in claim 15, after "display," insert -- cause the device to: --.

In column 19, line 37, in claim 18, delete "wherein" and insert -- wherein the --, therefor.

Signed and Sealed this
Eighteenth Day of August, 2015

Michelle K. Lee
*Director of the United States Patent and Trademark Office*